US008436388B2

(12) United States Patent
Lim et al.

(10) Patent No.: US 8,436,388 B2
(45) Date of Patent: May 7, 2013

(54) ILLUMINATION ASSEMBLY INCLUDING WAVELENGTH CONVERTING MATERIAL HAVING SPATIALLY VARYING DENSITY

(75) Inventors: Michael Lim, Cambridge, MA (US); David Doyle, Somerville, MA (US); Alexander L Pokrovskiy, Burlington, MA (US); Alexei A Erchak, Cambridge, MA (US); Gianni Taraschi, Somerville, MA (US); Nikolay I Nemchuk, North Andover, MA (US)

(73) Assignee: Rambus International Ltd., Grand Cayman (KY)

( * ) Notice: Subject to any disclaimer, the term of this patent is extended or adjusted under 35 U.S.C. 154(b) by 0 days.

(21) Appl. No.: 13/216,837

(22) Filed: Aug. 24, 2011

(65) Prior Publication Data

US 2011/0305002 A1  Dec. 15, 2011

Related U.S. Application Data

(62) Division of application No. 11/831,306, filed on Jul. 31, 2007, now abandoned.

(51) Int. Cl.
  *F21V 8/00* (2006.01)
(52) U.S. Cl.
  USPC ................................ 257/98; 257/99; 257/294
(58) Field of Classification Search .................... 257/98, 257/229, 294, 436, 440, 99
  See application file for complete search history.

(56) References Cited

U.S. PATENT DOCUMENTS

| 4,236,791 A | 12/1980 | Krueger et al. |
| 4,276,633 A | 6/1981 | Takami et al. |

(Continued)

FOREIGN PATENT DOCUMENTS

| JP | 10242531 | 9/1998 |
| JP | 10269822 | 10/1998 |

(Continued)

OTHER PUBLICATIONS

Grove, M., et al., "Color Flat Panel Manufacturing Using Ink Jet Technology", MicroFab Technologies, Inc., Display Works '99, pp. 1-4.

(Continued)

*Primary Examiner* — Marcos D. Pizarro
*Assistant Examiner* — Tifney Skyles
(74) *Attorney, Agent, or Firm* — Renner, Otto, Boisselle & Sklar, LLP

(57) ABSTRACT

Illumination assemblies, components, and related methods are described. An illumination assembly can include at least one solid state light-emitting device, an emission surface through which light is emitted, and a wavelength converting material that wavelength converts at least some light emitted by the solid state light-emitting device. The wavelength converting material can have a first density per unit area of the emission surface at a first location and a second density per unit area of the emission surface at a second location, wherein the second density is substantially different from the first density, and wherein the density per unit area is defined with a 1×1 cm$^2$ averaging area. Another illumination assembly can include a light guide configured to receive light emitted by a solid state light-emitting device. The light guide can have a length along which received light propagates and an emission surface substantially parallel to the length of the light guide and through which light is emitted. A wavelength converting material can have a density per unit area of the emission surface that substantially increases along the length of the light guide.

18 Claims, 18 Drawing Sheets

U.S. PATENT DOCUMENTS

| | | | |
|---|---|---|---|
| 4,470,666 A | 9/1984 | Eick | |
| 4,641,925 A | 2/1987 | Gasparaitis et al. | |
| 5,050,946 A | 9/1991 | Hathaway et al. | |
| 5,926,239 A | 7/1999 | Kumar et al. | |
| 6,464,366 B1 | 10/2002 | Lin et al. | |
| 6,600,175 B1 | 7/2003 | Baretz et al. | |
| 6,637,905 B1 | 10/2003 | Ng et al. | |
| 6,805,468 B2 | 10/2004 | Itoh et al. | |
| 6,979,095 B2 | 12/2005 | Min et al. | |
| 7,084,434 B2 | 8/2006 | Erchak et al. | |
| 7,118,438 B2 | 10/2006 | Ouderkirk et al. | |
| 7,196,354 B1 | 3/2007 | Erchak et al. | |
| 7,217,025 B2 | 5/2007 | Kim et al. | |
| 7,319,289 B2 | 1/2008 | Suehiro et al. | |
| 7,628,527 B2 | 12/2009 | Kim et al. | |
| 7,667,238 B2 | 2/2010 | Erchak et al. | |
| 2004/0061810 A1 | 4/2004 | Lowery et al. | |
| 2004/0252255 A1 | 12/2004 | Folkerts | |
| 2006/0001036 A1 | 1/2006 | Jacob et al. | |
| 2006/0002101 A1 * | 1/2006 | Wheatley et al. | 362/84 |
| 2006/0255711 A1 | 11/2006 | Dejima et al. | |
| 2007/0045640 A1 | 3/2007 | Erchak et al. | |
| 2007/0081360 A1 | 4/2007 | Bailey et al. | |
| 2007/0086184 A1 | 4/2007 | Pugh et al. | |
| 2007/0126678 A1 | 6/2007 | Shih et al. | |
| 2007/0127262 A1 | 6/2007 | Schultz et al. | |
| 2008/0074583 A1 | 3/2008 | Li et al. | |
| 2009/0034230 A1 | 2/2009 | Lim et al. | |
| 2009/0034292 A1 | 2/2009 | Pokrovskiy et al. | |
| 2009/0040745 A1 | 2/2009 | Nemchuk | |

FOREIGN PATENT DOCUMENTS

| | | |
|---|---|---|
| JP | 2003-43483 | 2/2003 |
| JP | 2004235669 | 8/2004 |
| TW | M317024 | 7/1995 |
| TW | 200813549 | 3/2008 |

OTHER PUBLICATIONS

Office Action from corresponding Taiwanese Application No. 97126257 dated Dec. 7, 2012 and English translation thereof.

* cited by examiner

US 8,436,388 B2

ILLUMINATION ASSEMBLY INCLUDING WAVELENGTH CONVERTING MATERIAL HAVING SPATIALLY VARYING DENSITY

RELATED APPLICATION DATA

This application is a divisional of U.S. patent application Ser. No. 11/831,306, filed Jul. 31, 2007, the disclosure of which is incorporated herein by reference in its entirety.

FIELD

The present embodiments are drawn generally towards illumination systems, and more specifically, illumination systems including solid state light-emitting devices.

BACKGROUND

Illumination assemblies can provide light for a variety of applications, including general lighting and electronic applications. For example, a backlighting assembly can be used to provide light for a display, such as a liquid crystal display (LCD). Currently such backlighting assemblies mainly employ cold cathode fluorescent tubes (CCFLs) light sources. Although these fluorescent tubes can provide efficient distributed lighting, serious disadvantages of fluorescent tubes include complicated inverter electronics, slow switching speeds, and the presence of hazardous materials, such as mercury, within the fluorescent tubes.

SUMMARY

Illumination systems, components, and methods associated therewith are provided.

In one aspect, an illumination assembly comprises at least one solid state light-emitting device, an emission surface through which light is emitted, and a wavelength converting material that wavelength converts at least some light emitted by the solid state light-emitting device, the wavelength converting material having a first density per unit area of the emission surface at a first location and a second density per unit area of the emission surface at a second location, wherein the second density is substantially different from the first density, and wherein the density per unit area is defined with a $1 \times 1$ cm$^2$ averaging area.

In another aspect, an illumination assembly comprises a solid state light-emitting device, a light guide configured to receive light emitted by the solid state light-emitting device, the light guide having a length along which received light propagates and an emission surface substantially parallel to the length of the light guide and through which light is emitted, and a wavelength converting material having a density per unit area of the emission surface that substantially increases along the length of the light guide.

In one aspect, a display comprises at least one solid state light-emitting device, an emission surface through which light is emitted, a wavelength converting material that wavelength converts at least some light emitted by the solid state light-emitting device, the wavelength converting material having a first density per unit area of the emission surface at a first location and a second density per unit area of the emission surface at a second location, wherein the second density is substantially different from the first density, and wherein the density per unit area is defined with a $1 \times 1$ cm$^2$ averaging area, and a liquid crystal layer arranged to receive at least some wavelength converted light emitted by the wavelength converting material.

In one aspect, a display comprises at least one solid state light-emitting device, a first wavelength converting material region that wavelength converts at least some light emitted by the solid state light-emitting device to a first wavelength spectrum, a second wavelength converting material region that wavelength converts at least some light emitted by the solid state light-emitting device to a second wavelength spectrum different from the first wavelength spectrum, and a liquid crystal layer comprising a first pixel light valve arranged to receive at least some wavelength converted light emitted by the first wavelength converting material, and a second pixel light valve arranged to receive at least some wavelength converted light emitted by the second wavelength converting material.

In one aspect, a method of making an illumination assembly comprising providing at least one solid state light-emitting device, and providing a wavelength converting material that wavelength converts at least some light emitted by the solid state light-emitting device, the wavelength converting material having a first density per unit area of an emission surface at a first location and a second density per unit area of the emission surface at a second location, wherein the second density is substantially different from the first density, and wherein the density per unit area is defined with a $1 \times 1$ cm$^2$ averaging area.

Other aspects, embodiments and features of the invention will become apparent from the following detailed description of the invention when considered in conjunction with the accompanying figures. The accompanying figures are schematic and are not intended to be drawn to scale. Each identical or substantially similar component that is illustrated in various figures is represented by a single numeral or notation.

For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Figure 1A:
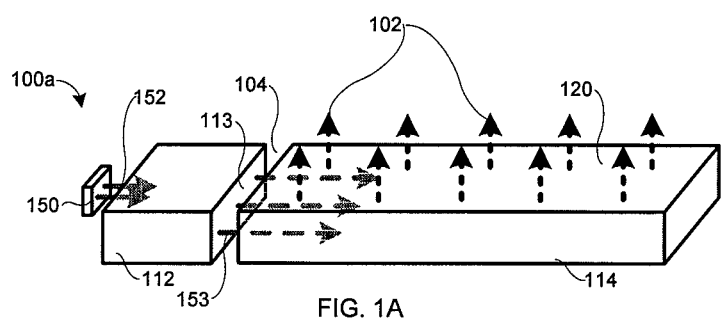
FIG. 1A is a perspective view of an illumination assembly including a wavelength converting material, in accordance with one embodiment.

Illumination assemblies presented herein can include one or more solid state light-emitting devices, such as light-emitting diodes and/or laser diodes. These solid state light-emitting devices can serve as high brightness compact light sources for a variety of applications. Since solid state light-emitting devices are typically compact light sources, for applications where distributed lighting is desired, light emitted by the solid state light-emitting devices can be incorporated into an illumination assembly that can redirect and emit light via an extended light emission surface having a surface area substantially greater than the emission surface of the light-emitting devices (e.g., greater than about 100 times, greater than about 500 times, greater than about 1000 times, greater than about 2000 times). Some embodiments presented herein can accomplish such redirection and emission of light from one or more solid state light-emitting devices and can provide for distributed illumination via an extended light emission surface. In some embodiments, during the process of light redirection and/or emission, some or all of the light from the light-emitting devices may be wavelength converted. Wavelength conversion of some or all of the light can facilitate redirection and/or emission of the light from the illumination assembly.

Some embodiments presented herein include illumination assemblies with one or more solid state light-emitting devices that can emit primary light having a first wavelength spectrum and a wavelength converting material (e.g., phosphors and/or quantum dots) that can covert the primary light to secondary light having a different wavelength spectrum (e.g., down-convert the primary light to a lower energy). As used herein, a wavelength converting material refers to a material that can absorb some or substantially all of the primary light having a first wavelength spectrum (e.g., blue light, UV light) and emit secondary light having a second different wavelength spectrum (e.g., white light, yellow light, red light, green light, and/or blue light). The wavelength converting material can down-convert light from shorter wavelengths (higher energies) to longer wavelengths (shorter energies). Phosphors are examples of typical wavelength converting materials, which can take the form of phosphor particles. Quantum dots can also serve as wavelength converting materials.

In some embodiments presented herein, the wavelength converting material can have a density that differs in different locations. The density of wavelength converting material per unit area is the amount of wavelength converting material per averaging area disposed above and underneath an averaging area of $1 \times 1$ cm$^2$. For example, in some embodiments, the averaging area can be located on the emission surface of an illumination assembly, and in such cases, the density is referred to as the density of wavelength converting material per unit area of the emission surface. Such an averaging area excludes variations of wavelength converting material density at the package level of a solid state light-emitting device, for example, variations of wavelength converting material density within an encapsulant layer of a light-emitting device.

FIG. 1A illustrates an illumination assembly including one or more solid state light-emitting devices, in accordance with one embodiment. Illumination assembly 100a can include a solid state light-emitting device 150 which may include one or more light-emitting diodes and/or laser diodes. Although the illumination assembly illustrated in FIG. 1A is edge-lit by one or more solid state light-emitting devices, alternatively or additionally, an illumination assembly can be back-lit by one or more solid sate light-emitting devices. In some embodiments, a plurality of illumination assemblies, similar to illumination assembly 100a, can be arranged adjacent each other (e.g., tiled along either one or two dimensions) to form a combined illumination assembly having a combined light emission surface (e.g., adjacent light emission surfaces that can tile a surface, such as a plane). The light emission surface area of an illumination assembly (or combined assembly) may be greater than about 0.01 m$^2$ (e.g., greater than or equal to about 0.05 m$^2$, greater than or equal to about 0.1 m$^2$, greater than or equal to about 0.16 m$^2$, greater than or equal to about 0.5 m$^2$, greater than or equal to about 1 m$^2$). In some embodiments, the light emission surface area of an illumination assembly ranges between about 0.01 m$^2$ and about 0.05 m$^2$, between about 0.05 m$^2$ and about 0.1 m$^2$, between about 0.1 m$^2$ and about 0.5 m$^2$, or between about 0.5 m$^2$ and about 1 m$^2$.

Light 152 (referred to as primary light) emitted by the light-emitting device 150 may be coupled into a light homogenization region 112 that can spatially distribute the light such that light emitted via a light output boundary 113 (e.g., light output surface) has a substantially uniform intensity on different locations of the light output boundary 113. Light homogenization region 112 may be a region where light is not substantially extracted along the length of the homogenization region 112.

Light homogenization region 112 may comprise a light guide having a higher index than a surrounding medium. The light guide can include an edge configured to receive the light emitted by the solid state light-emitting device 150. For example, light homogenization region 112 may include part or all of a light guide formed of an optically transparent material such as transparent plastic (e.g., PMMA, acrylic) and/or glass. The light guide can have any suitable shape. In some embodiments, the light guide has a slab shape (e.g., rectangular slab, square slab, trapezoidal slab), a cylindrical shape (e.g., rod with a circular or elliptical cross-section), and/or other suitable light guiding shapes. The shape of the light output boundary of the homogenization region may be related to the shape of the light guide, for example, a rectangular light guide including a homogenization region may be such that the light output boundary is a rectangular cross-section of the rectangular guide, as illustrated in FIG. 1A.

Light 153 outputted by the light homogenization region 112 may be coupled to a light extraction region 114 where light is substantially extracted along the light extraction region 114. Light extraction region 114 can include a light emission surface 120 through which light 102 can be emitted. The emission surface of the light extraction region may be substantially perpendicular to the general direction of the light 153 inputted into the light extraction region 114. Light extraction region 114 can include light scattering features that can scatter light out via the light emission surface 120. In some embodiments, light extraction region 114 can be configured and arranged such that light emission form emission surface 120 has a substantially uniform (e.g., less than about 20% variation, less than about 15% variation, less than about 10% variation) light intensity across the emission surface 120.

Light extraction region 114 may comprise a light guide. Light scattering features may be located in the light guide volume and/or on the top and/or bottom surfaces of the light guide. The number of scattering features may vary along the length of the light guide so as to ensure that light emission via the light emission surface is substantially uniform along the length of the light guide. As illustrated in FIG. 1A, the light emission surface 120 can be substantially parallel to the length of the light guide. In some embodiments, the intensity variation of light emitted along the length of the light guide is less than about 20% (e.g., less than about 15%, less than about 10%, less than about 5%). In some embodiments, light extraction region 114 may include part or all of a light guide formed of an optically transparent material such as glass or a plastic material (e.g., acrylic, PMMA).

In some embodiments, a gap 104 may be present between the light output boundary 113 of homogenization region 112 and the light extraction region 114. the gap 104 can ensure that any light that is coupled into the light extraction region 114 remains confined in the light extraction region due to total internal reflection (e.g., in the absence of scattering features and/or a light guide tapering). Alternatively, homogenization region 112 and extraction region 114 may be in contact with each other. For example, homogenization region 112 and extraction region 114 may both be part of a single light guide.

Illumination assembly 100a can include wavelength converting material in one or more locations, such as one or more phosphors and/or one or more types of quantum dots. The wavelength converting material can absorb and convert primary light having a first wavelength spectrum to secondary light having a second wavelength spectrum different from the first wavelength spectrum. In some embodiments, the wavelength converting material can down-convert light having higher energy (e.g., shorter wavelengths) to light having lower energy (e.g., longer wavelengths). For example, the wavelength converting material can down-convert blue and/or ultraviolet light to longer wavelength light, such as red, green, yellow, or blue light, or combinations thereof. White light can be created with a combination of multiple colors, for example, blue and yellow, or blue, green, and red. Thus, one method of forming white light using a wavelength converting material can include down-converting some blue primary light to yellow and forming white light with a combination of secondary yellow light and unconverted primary blue light. Another method of forming white light includes down-converting some primary blue light to red and green light, for example using two or more different wavelength converting materials (e.g., a red-emitting and a green-emitting wavelength converting material). Another method of forming white light includes down-converting ultraviolet light to red, green, and blue light, for example using two or more different wavelength converting materials (e.g., a red-emitting, a green-emitting, and a blue-emitting wavelength converting material).

In some embodiments, wavelength converting material is disposed within homogenization region 112. Alternatively, or additionally, wavelength converting material may be disposed within extraction region 114. The presence of wavelength converting material in the illumination assembly can facilitate the process of spatial homogenization and/or extraction of light from the illumination assembly (e.g., via the light emission surface 120).

The wavelength converting material may be located within part or all of the homogenization region 112 such that some or all of the primary light from light-emitting device 150 may be wavelength converted within the homogenization region 112. The process of wavelength conversion can facilitate light homogenization since primary light 152 traveling in a given direction based on the arrangement of the light-emitting device 150 can be absorbed by the wavelength converting material and secondary light can be re-emitted in any other direction with equal probability. This can also allow for a decrease in the length of the homogenization region used to provide for a substantially uniform light intensity at light output boundary 113. The placement of the wavelength converting material in the homogenization region 112 can provide for the output of secondary light from the homogenization region 112, or a combination of secondary and primary light.

In some embodiments, the wavelength converting material may be uniformly distributed throughout the light homogenization region 112. In other embodiments, the wavelength converting material may have a varying density for at least two locations in the homogenization region 112. For example, the density of wavelength converting material can be highest at the light output boundary 113. Alternatively, the density of wavelength converting material can be lowest at the light output boundary 113. The wavelength converting material density may be graded and may vary (e.g., decrease or increase) as a function of distance from the light output boundary (or equivalently, as a function of distance from the light source).

One or more different wavelength converting materials can be included in the illumination assembly. In some embodiments, the wavelength converting material includes a first wavelength converting material that can emit secondary light having a first dominant wavelength and a second wavelength converting material that can emit secondary light having a second dominant wavelength different from the first dominant wavelength. The first wavelength converting material can be disposed in the optical path between the solid state light-emitting device and the second wavelength converting material. The first dominant wavelength can be larger than the second dominant wavelength. In other embodiments, the first dominant wavelength can be smaller than the second dominant wavelength. A wavelength filter can be disposed in the optical path between the first and the second wavelength converting materials, and configured to reflect light emitted by the second wavelength converting material and transmit light emitted by the first wavelength material and the solid state light-emitting device.

Alternatively, or additionally, wavelength converting material may be located within part or throughout all of the light extraction region 114. Primary light traveling within light extraction region 114 can thus be wavelength converted and secondary light can be generated and extracted via emission surface 120. Primary light traveling through the light extraction region 114 can also be scattered by wavelength converting material within the light extraction region 114 and some of the primary light can thus be extracted via emission surface 120 by such a mechanism. Light outputted by the illumination assembly can include both some primary light and secondary light. Alternatively, the light outputted by the illumination assembly may include secondary light with no primary light. In some embodiments, the light outputted by the illumination assembly is white light, which may be formed by the combination of primary light (e.g., blue light) and secondary light (e.g., yellow light). Alternatively, the light outputted by the illumination assembly is white light including the secondary light and not including any substantial amount of primary light (e.g., UV light).

Figure 1B:
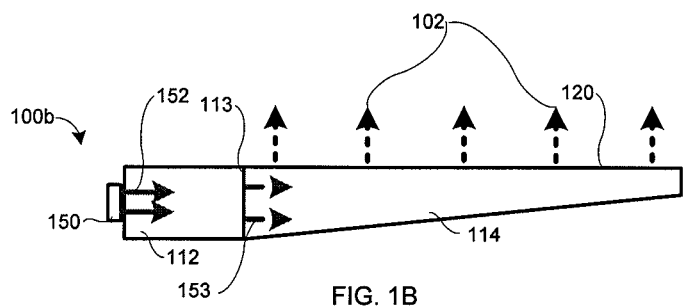
FIG. 1B is a cross-section view of an illumination assembly including a tapered extraction region, in accordance with one embodiment.

FIG. 1B is a cross-section view of an illumination assembly 100*b* including a tapered extraction region 114, in accordance with one embodiment. The taper can be provided by a wedge-shaped light guide. The light guide can include an edge configured to receive the light emitted by the solid state light-emitting device. A tapered extraction region 114 can facilitate light extraction via the frustration of total internal reflection in the light guide. Such a mechanism can be used alone, or in combination with light scattering features (e.g., surface features such as prisms and/or lens, volume features such as regions with different refractive indices than the surrounding light guide material), to provide for light extraction via light emission surface 120.

It should be appreciated that illumination assemblies can include one or more reflectors. A backside reflector can be disposed under the backside surface (e.g., opposite the light emission surface 120) of the light extraction region and can reflect back any light that is scattered downwards (e.g., by light extraction features). That reflected light can then be extracted via light emission surface 120.

Figure 1C:
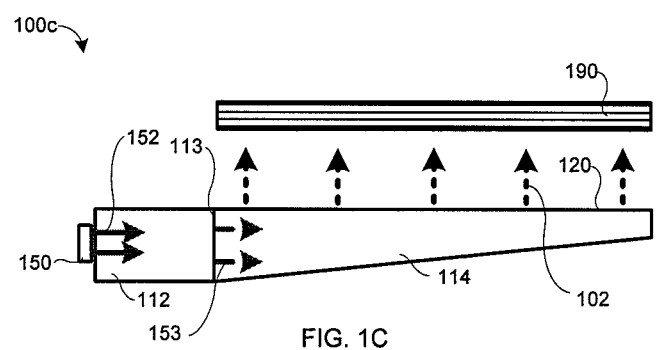
FIG. 1C is a cross-section view of a display including an illumination assembly as a backlight unit, in accordance with one embodiment.

In some embodiments, an illumination assembly can serve as a backlight unit for a display, such as a LCD. Such an embodiment is illustrated in the cross-section schematic of FIG. 1C. One or more layers 190 of the display 100*c* may be illuminated by the illumination assembly. Layer(s) 190 may include a liquid crystal light valve layer (corresponding to the liquid crystal light-valve pixels of the display) located over light emission surface 120. The illumination assembly can thus serve as a backlighting assembly for the liquid crystal display layer and light 102 from the illumination assembly can impinge on the liquid crystal display layer.

Other layers often used in LCDs, such as diffuser layers, brightness enhancement films (BEFs), and/or color filters may be located over the light emission surface of the illumination assembly. In addition to display backlighting, the illumination assembly can be used for illumination purposes, including but not limited to, signage backlighting, outdoor lighting, indoor lighting, automotive lighting, and other lighting applications. For a general lighting assembly, the illumination assembly can be used as is or may have other layers disposed over the emission surface of the assembly, for example one or more layers may be located over the assembly so as to alter the lightening character. For example, a textured or patterned layer or optic (e.g., a polymer and/or glass component) may be placed over the assembly.

In some embodiments, a liquid crystal display system can include a small number of high light output power light-emitting devices that provide illumination for a large display area. Such a liquid crystal display can include a liquid crystal display panel having an illumination area, and at least one sold state light-emitting device associated with the liquid crystal display panel such that light emitted from the solid state light-emitting device illuminates the liquid crystal display panel. The display can include a wavelength converting material located remotely (e.g., in a light homogenization region 112 and/or a light extraction region 114) from solid state light-emitting device. In some embodiments, the number of solid state light-emitting device per $m^2$ of the illumination area is less than 100, as discussed further below.

In some embodiments, a small number of high light output power light-emitting devices can be used to illuminate a large emission area of an illumination assembly (e.g., an LCD backlighting assembly). In some embodiments, the number of light-emitting devices per unit area of the emission surface of an illumination assembly is less than or equal to about 300 per $m^2$ (e.g., less than or equal to about 200 per $m^2$, less than or equal to about 100 per $m^2$, less than or equal to about 50 per $m^2$, less than or equal to about 25 per $m^2$, less than or equal to about 12 per $m^2$). For example, the number of light-emitting devices per $m^2$ of the emission surface of an illumination assembly may be between 5 to 100, between 25 to 100, or between 50 to 100. A small number of light-emitting devices per unit area can be enabled by the use of high-power light-emitting devices which can be designed to emit a substantial amount of their generated light via a large die surface area (e.g., greater than about 4 $mm^2$, greater than about 10 $mm^2$, greater than about 30 $mm^2$, greater than about 100 $mm^2$), as discussed further below.

The number of light-emitting devices per illumination assembly may be less than or equal to 12 (e.g., less than or equal to about 8, less than or equal to about 6, less than or equal to about 4, less than or equal to about 2). In some embodiments, a single light-emitting device may illuminate an entire illumination assembly.

The total number of light-emitting devices for certain illumination assemblies has been provided above. For numbering purposes, each of the following may count as one light-emitting device: a light-emitting die, two or more associated light-emitting dies, a partially packaged light-emitting die or dies, or a fully packaged light-emitting die or dies. For example, one light-emitting device may include a red light-emitting die associated with a green light-emitting die and associated with a blue light-emitting die.

In some embodiments, a light-emitting device is a light-emitting device that emits light of a single color. For example, the light-emitting device may be a red, green, blue, yellow, and/or cyan light-emitting device. In other embodiments, the light-emitting device is a multi-colored light-emitting device that emits light having a spectrum of wavelengths. For example, the light-emitting device may be a red-green-blue light-emitting device. In other embodiments, the light-emitting device may be a red-green-blue-yellow light-emitting device. In yet other embodiments, the light-emitting device may be a red-green-blue-cyan light-emitting device. In yet other embodiments, the light-emitting device is a red-green-blue-cyan-yellow light-emitting device. Illumination assemblies can also include combinations of light-emitting device types such as the ones described above. Of course, light-emitting devices of different colors can also be used in embodiments.

Figure 2A:
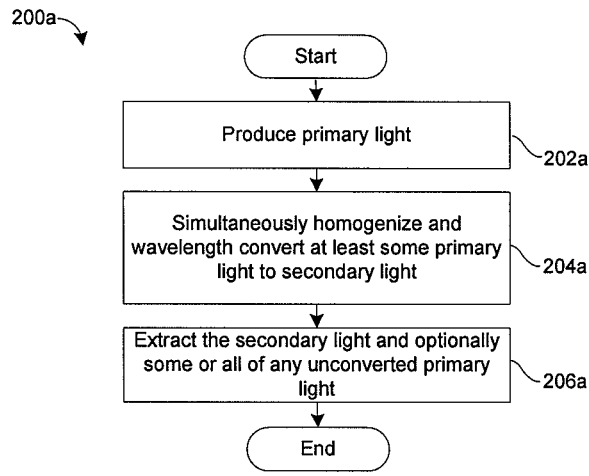
FIGS. 2A-B are flowcharts of methods for wavelength converting and spatially homogenizing light, in accordance with one embodiment.

Illumination assemblies such as those illustrated herein can be used to perform light homogenization and/or light extraction. FIG. 2A illustrates a flowchart 200a of a method for homogenizing and wavelength converting light simultaneously, in accordance with one embodiment. The method can be performed by an illumination assembly that can include a wavelength converting material in a light homogenization region, such as the illumination assemblies illustrated in FIGS. 1A-C. The method can begin with the production of primary light (act 202a). The primary light may be generated by a solid state light-emitting device, such as one or more light-emitting diodes and/or laser diodes.

The primary light may then be spatially homogenized and some or substantially all of the primary light may be wavelength converted to secondary light (act 204a). The wavelength conversion may be performed by wavelength converting material, such as one or more phosphors and/or one or more types of quantum dots. Since the process of wavelength conversion can involve the absorption of primary light by the wavelength converting material and the emission of secondary light (e.g., down-converted to lower energies) with any direction of emission having an equal probability, spatial homogenization can be accomplished using shorter homogenization lengths that without the use of a wavelength converting material. The method can proceed with the extraction of the secondary light and optionally also some or all of any unconverted primary light (act 206a). Light extraction may occur via a light emission surface of a light extraction region of an illumination assembly. The light emission surface may be a surface of a light guide, such as a top face of a slab light guide, as previously described. In some embodiments, wavelength conversion occurs only within the homogenization region and not within the light extraction region.

Figure 2B:
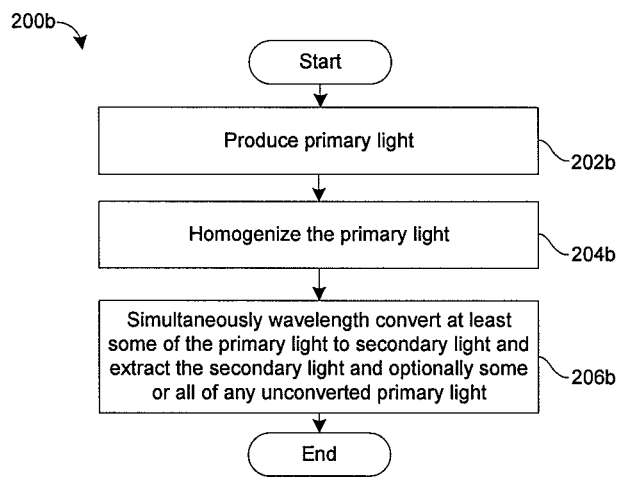

FIG. 2B illustrates a flowchart 200b of a method for wavelength converting and extracting light simultaneously, in accordance with one embodiment. The method can be performed by an illumination assembly that can include a wavelength converting material in an extraction region, such as the illumination assemblies illustrated in FIGS. 1A-C. The method can begin with the production of primary light (act 202b). The primary light may be generated by a solid state light-emitting device, such as one or more light-emitting diodes and/or laser diodes. The primary light may then be spatially homogenized (act 204b).

The method can proceed with the simultaneous wavelength conversion of at least some of the primary light to secondary light and extraction of the secondary light and optionally also some or all of any unconverted primary light. The wavelength conversion may be performed by wavelength converting material, such as one or more phosphors and/or one or more types of quantum dots. In some embodiments, the wavelength converting material (e.g., phosphor particles and/or quantum dots) can absorb some primary light impinging thereon and/or scatter some light (e.g., primary or secondary light) impinging thereon. The process of wavelength conversion can involve the absorption of primary light by the wavelength converting material and the emission of secondary light (e.g., down-converted to lower energies) with any direction of emission having an equal probability. Also, some primary light that impinges on wavelength converting material within the light extraction region may be scattered and thereby extracted. Therefore, the wavelength converting material can perform both wavelength conversion and light scattering. The method can proceed with the extraction of some or all of the secondary light and optionally some or all of any unconverted primary light (act 206a). Light extraction may occur via a light emission surface of a light extraction region of an illumination assembly. The light emission surface may be a surface of a light guide, such as a top face of a slab light guide. In some embodiments, wavelength conversion occurs only within the light extraction region and not within the light homogenization region.

Figure 3A:
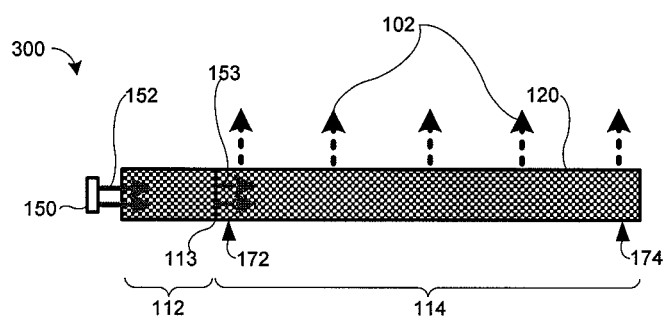
FIG. 3A is a cross-section view of an illumination assembly having a spatially varying density of a wavelength converting material, in accordance with one embodiment.

FIG. 3A is a cross-section view of an illumination assembly 300 having a different density of a wavelength converting material for at least two locations, in accordance with one embodiment. By arranging the wavelength converting material with a density that differs in different locations, the percentage of primary light that is wavelength converted to secondary light at various locations can be different. Spatial variation in the percentage of primary light that is wavelength converted at different locations can be used to output light with a desired intensity at different locations of a light emission surface 120. For example, the wavelength converting material density can be higher in locations where the primary light intensity is lower (as compared to locations with a higher primary light intensity). Such a configuration may be used to compensate for the spatial variation of primary light intensity along the light extraction region 114 such that the amount of secondary light generated and outputted at different locations along the light emission surface 120 is substantially uniform. Furthermore, the wavelength converting material can serve as light scattering features that can scatter primary light out via the emission surface 120, therefore the spatial variation of the wavelength converting material density may also allow for the primary light outputted from the light emission surface 120 to be substantially uniform over the entire surface.

The density of wavelength converting material per unit area of the light emission surface 120 may vary substantially (e.g., at least 30% variation, at least 60% variation, at least 100% variation) at different locations. For example, the density of the wavelength converting material per unit area of the light emission surface may vary as a function of distance from the solid state light-emitting device 150. The density of the wavelength converting material can vary at different locations of the light extraction region 114. Alternatively, or additionally, the density of the wavelength converting material can vary at different locations of the light homogenization region 112. For example, locations 172 and 174 of FIG. 3A represent two opposing ends of the light extraction region 114 at which the wavelength converting material density per unit emission area can differ.

In some embodiments, the density of the wavelength converting material can substantially increase (e.g., monotonically) further away from the solid state light source, such as the solid state light-emitting device 150. In some embodiments, the density of the wavelength converting material is such that at locations further away from the solid state light-emitting device 150, the density is substantially greater (e.g., greater than about 30%, greater than about 60%, greater than about 100%) than that at locations closer to the solid state light-emitting device 150.

Figure 3B:
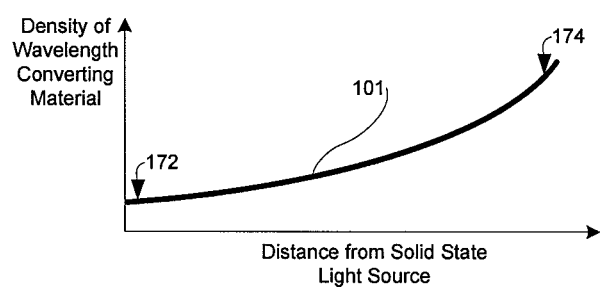
FIG. 3B is a chart of a density of wavelength converting material versus distance from a light source, in accordance with one embodiment.

FIG. 3B is a plot of the density of wavelength converting material versus distance from a light source, in accordance with one embodiment. Curve 101 represents the wavelength converting material density (e.g., per unit volume, area, or length) as a function of distance from the light source, where in the illustrated plot the wavelength converting material density increases with distance from the solid state light-emitting device 150.

For the illustrated example, the variation of the wavelength converting material density can be expressed in terms of the distance along the light extraction region 114. For example, the left-most portion of curve 101 may be associated with the density at location 172 of the light extraction region 114 and the right-most portion of the curve 101 may be associated with the density at location 174 of the light extraction region 114. In some embodiments, the wavelength converting material density can be lower in locations illuminated with a higher intensity of light (e.g., primary light) from the solid state light-emitting device 150 than in locations illuminated with a lower intensity of light (e.g., primary light) from the solid state light-emitting device 150. For illumination assemblies having a plurality of solid state light-emitting devices, the wavelength converting material can have a lower density in locations illuminated with a higher intensity of light (e.g., primary light) from the plurality of solid state light-emitting devices than in locations illuminated with a lower intensity of light (e.g., primary light) from the plurality of solid state light-emitting devices.

In some embodiments, a spatial variation of the density of wavelength converting material can be used to facilitate spatially uniform light emission across the light emission surface 120 of the light extraction region 114. The intensity of the secondary light and/or primary light emitted and/or scattered by the wavelength converting material can vary by less than about 20% (e.g., less than about 15%, less than about 10%, less than 5%) across the light extraction region 114. For example, in the case of a variation of light intensity of less than about 10% across the light extraction region, a first density at a first location and a second density at a second location of the light extraction region 114 can be such that the wavelength converted light intensity (e.g., secondary light intensity) from the first location is at least about 90% the wavelength converted light intensity (e.g., secondary light intensity) from the second location and no greater than about 110% the wavelength converted light intensity from the second location. In some embodiments, the density can vary inversely with the primary light intensity at different locations along the light extraction region 114. For example, the second density can be greater than or equal to about 2 times (e.g., greater than or equal to about 3 times, greater than or equal to about 4 times) the first density, which can compensate for approximately a 50% reduction in primary light intensity so as to produce substantially the same intensity of secondary light at the first and second locations along the light extraction region 114. As should be appreciated, the first and second locations can be opposing ends of a light extraction region 114 (e.g., locations 172 and 174), however the embodiments are not limited in this respect.

Figure 4:
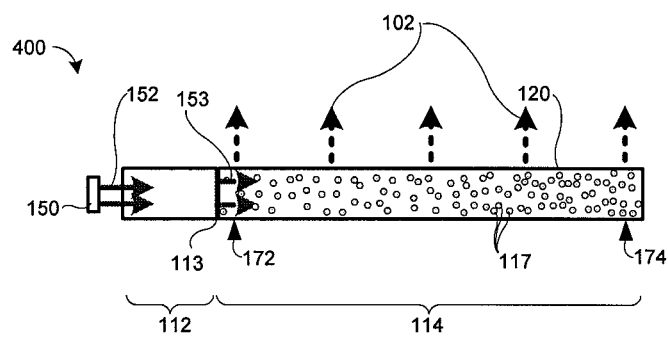
FIG. 4 is a cross-section view of an illumination assembly having a spatially varying density of a wavelength converting material due to a differing microscopic density of the wavelength converting material, in accordance with one embodiment.

FIG. 4 is a cross-section view of an illumination assembly 400 having a different density of a wavelength converting material (e.g., per unit area over an averaging area of 1×1 cm² on the emission surface 120) for at least two locations due to a differing microscopic density of the wavelength converting material, in accordance with one embodiment. A first location 172 can have a first density of wavelength converting material 117 and a second location 174 can have a second density of wavelength converting material 117. The second density can be substantially different from the first density at least partially due to a differing microscopic density of wavelength converting material at the first and second locations. As described herein, the wavelength converting material can include one or more phosphors and/or quantum dots, and the microscopic density can be the number of phosphor molecules and/or quantum dots per unit volume over a length-scale much smaller than the averaging length-scale used to calculate the density (e.g., much smaller than an averaging area of 1×1 cm²). As illustrated in FIG. 4, wavelength converting material 117 can be dispersed throughout the light extraction region 114 or on portions of the light extraction region 114. In some embodiments, the wavelength converting material 117 microscopic density can vary (e.g., increase monotonically, decreases monotonically) along the length of the light extraction region 114.

Figure 5:
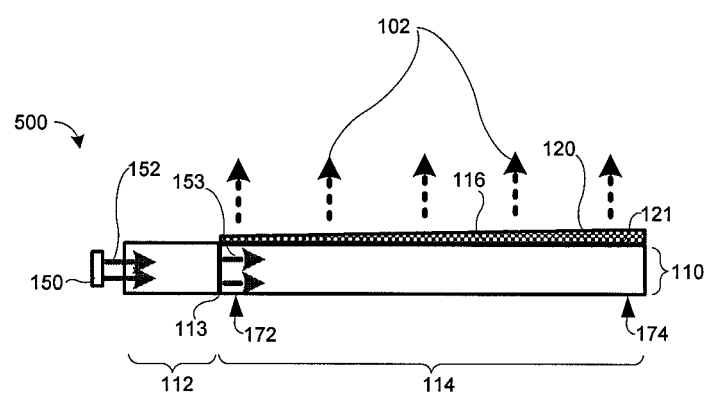
FIG. 5 is a cross-section view of an illumination assembly having a spatially varying density of a wavelength converting material due to a differing thickness of a wavelength converting material layer, in accordance with one embodiment.

FIG. 5 is a cross-section view of an illumination assembly 500 having a different density of a wavelength converting material (e.g., per unit area over an averaging area of 1×1 cm² on the emission surface 120) for at least two locations due to a differing thickness of a wavelength converting material region, in accordance with one embodiment. The wavelength converting material region 116 can include a wavelength converting material layer that can comprise wavelength converting material (e.g., phosphor and/or quantum dot particles) in a host material (e.g., polymer, glass). The density of wavelength converting material per unit area of the light emission surface 120 at a first location 172 may be substantially different from the density at a second location 174 at least partially due to a differing thickness of the wavelength converting material region 116 at the first location 172 and second location 174. In some embodiments, the wavelength converting material region 116 (e.g., layer) can be part of the light extraction region 114. When a light extraction region 114 includes a light guide 110, the wavelength converting material region 116 (e.g., layer) may be disposed over the light guide 110 (e.g., on light emission surface 121 of the light guide 110), disposed under the light guide 110 (e.g., on a backside opposing the light emission surface 121 of the light guide), and/or embedded in the light guide 110.

Other ways of varying the density of wavelength converting material (e.g., per unit area over an averaging area of 1×1 cm² on the emission surface 120) are possible. For example, in some embodiments, the wavelength converting material can be part of a plurality of wavelength converting material regions (e.g., each region having a size of less than about 50 microns, less than about 100 microns, or less than about 500 microns) and the density of the wavelength converting material (e.g., per unit area over an averaging area of 1×1 cm² on the emission surface 120) can vary from one location to another at least partially due to a differing spatial arrangement and/or size of the plurality of wavelength converting material regions. In some embodiments, the wavelength converting material regions include dots, squares, rectangles, triangles, hexagons, stripes, and/or any other shapes that can include wavelength converting material (e.g., dispersed in and/or on a host material).

Figure 6:
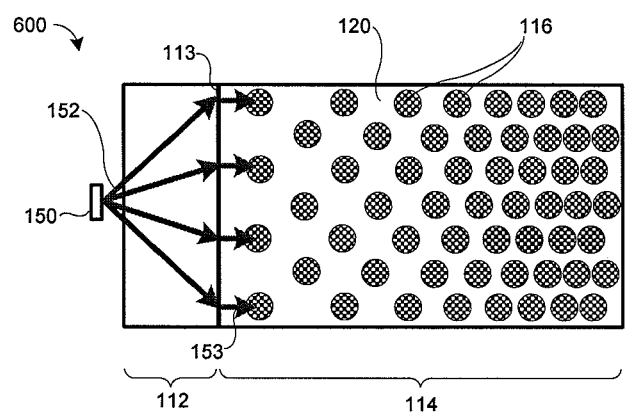
FIG. 6 is a top view of an illumination assembly having a spatially varying density of a wavelength converting material due to a differing spatial arrangement of a plurality of wavelength converting material regions, in accordance with one embodiment.

FIG. 6 is a top view of an illumination assembly 600 having a different density (e.g., per unit area over an averaging area of 1×1 cm² on the emission surface 120) of a wavelength converting material for at least two locations due to a differing spatial arrangement of a plurality of wavelength converting material regions 116, in accordance with one embodiment. The wavelength converting material regions 116 can comprise wavelength converting material (e.g., phosphor and/or quantum dot particles) in a host material (e.g., polymer, glass).

In the illustrated illumination assembly 600, the wavelength converting material regions 116 can be dots, squares, stripes, and/or any other suitable shapes. The plurality of wavelength converting material regions 116 can have substantially similar shapes. The wavelength converting material regions 116 can be arranged spatially so as to have different nearest neighbor distances as a function of location along the light extraction region 114. In some embodiments, the wavelength converting material regions 116 can be arranged in a periodic or non-periodic pattern. Examples of such patterns are described in further detail below.

Figure 7:
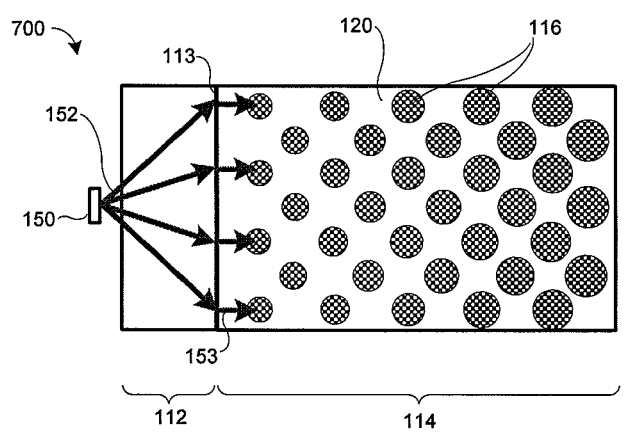
FIG. 7 is a top view of an illumination assembly having spatially varying density of a wavelength converting due to a differing size of a plurality of wavelength converting material regions, in accordance with one embodiment.

FIG. 7 is a top view of an illumination assembly 700 having a different density of a wavelength converting material for at least two locations due to a differing size of a plurality of wavelength converting material regions 116, in accordance with one embodiment. As illustrated, the size of the wavelength converting material regions 116 can vary with location along the light extraction region 114 (e.g., as a function of distance from the light-emitting device 150), and the spatial arrangement (of the centers) of the wavelength converting material regions 116 can be the same for all locations. It should be appreciated that the density of wavelength converting material (e.g., per unit area over an averaging area of 1×1 cm$^2$ on the emission surface 120) can be different in different locations due to one or more of the aforementioned reasons and/or other reasons.

Figure 8A:
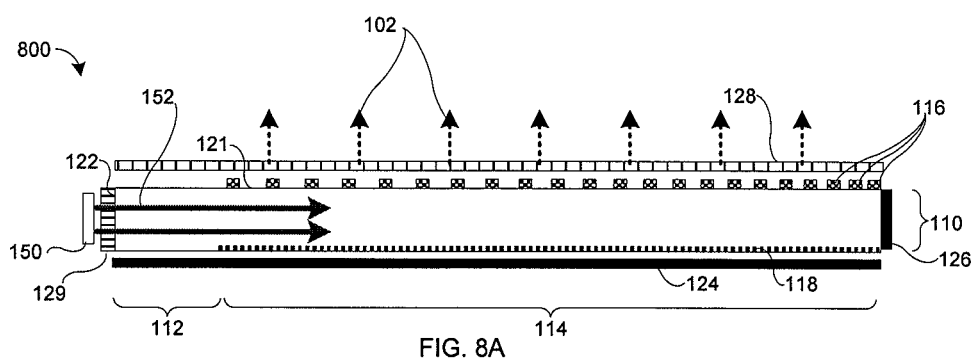
FIGS. 8A-B are cross-section and top views, respectively, of an illumination assembly including wavelength converting material over a light emission surface of a light guide, in accordance with one embodiment.
Figure 8B:
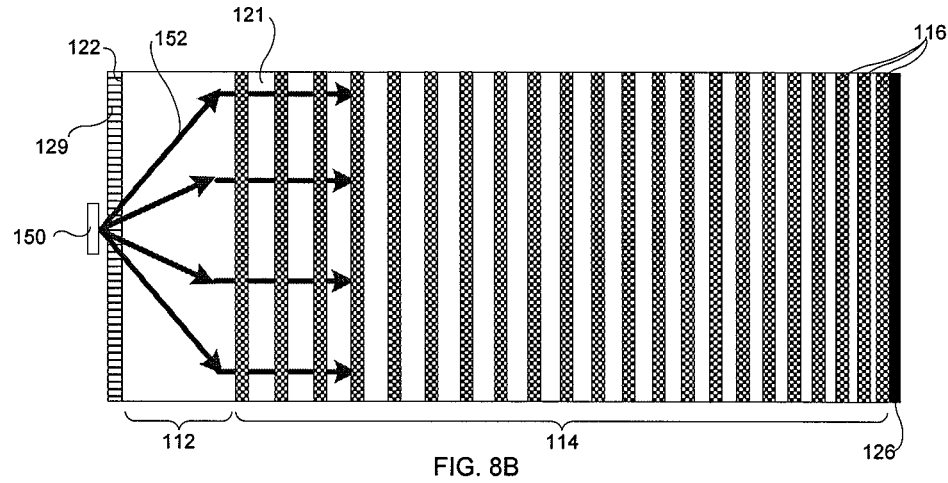

FIGS. 8A-B are cross-section and top views, respectively, of an illumination assembly 800 including wavelength converting material disposed over a light emission surface 121 of a light guide 110, in accordance with one embodiment. The light guide 110 can be configured to receive light 152 emitted by the solid state light-emitting device 150. Light guide 110 can include an edge 122 configured to receive light 152 emitted by the solid state light-emitting device 150. The light guide 110 can include a length along which received light propagates. As previously described, light from the light-emitting device 150 may be spatially homogenized in light homogenization region 112. Homogenized light may be coupled into the light extraction region 114.

Light guide 110 can include a light emission surface 121. In some embodiments, wavelength converting material regions 116 may be disposed over the light emission surface 121 of the light guide 110. It should be appreciated that since the wavelength converting material regions 116 can emit secondary light (e.g., wavelength converted light) and potentially scatter primary light that impinges on the wavelength converting material features 116, both the wavelength converting material regions 116 and the light guide 110 can be considered to be part of the light extraction region 114 of the illumination assembly 800. Therefore the light emission surface of the illumination assembly 800 can comprise the exposed surfaces of the wavelength converting material features 116 and the exposed surface of the light guide 110.

Light coupled into the extraction region 114 may travel and remain confined within light guide 110 in part or completely due to total internal reflection off of the surfaces of the light guide 110. Alternatively, or additionally, light confinement within the light guide 110 may be due to reflective regions disposed in contact with at least a portion of the light guide 110 surfaces. For example, reflective layer 126 may be located over the edge of the light guide 110 opposing the light input edge 122. A reflector 124 may be disposed under the backside surface of the light guide 110. Reflective layers may be directly in contact with the light guide or may be separated from the light guide by a gap. Reflective layers may be formed of any suitable material, including but not limited to a reflective metal (e.g., aluminum, silver, and/or combinations thereof), and may be specular and/or diffuse reflectors.

Light traveling within the extraction region 114 may be emitted due to a frustration of total internal reflection which may be due to light scattering due to light scattering features 118 (e.g., convex lens, concave lens, convex prisms, concave prisms, refractive index variations), a tapering of the light guide thickness along the length of the guide (not shown), scattering of primary or secondary light due to interaction with wavelength converting material in regions 116, and/or emission of wavelength converted light (e.g., secondary light) by wavelength converting material in regions 116. In some embodiments, the scattering of primary light can be solely due to interaction with the wavelength converting material and no light scattering features 118 need be present. In some embodiments, scattering features 118 may be present on the backside surface and/or emission surface 121 of the light guide.

In some embodiments, the wavelength converting material may have a varying density per unit area of the emission surface along the length of the light guide. In some embodiments, the wavelength converting material has a density per unit area of the emission surface that substantially increases along the length of the light guide. Density can thus generally increase along the length of the light guide, however there may exist minor variations about the generally increasing density trend.

Wavelength converting material features 116 may have any desired shapes (e.g., stripes, dots, squares) and may be arranged in with varying nearest neighbor distances along the length of the light guide 110. In the illustrated illumination assembly shown in FIGS. 8A-B, the wavelength converting region(s) 116 take the form of stripes and can be spaced closer to each other further away from the light-emitting device 150. The wavelength converting material regions 116 may include a layer at least partially or completely disposed over the emission surface of the light guide 110. The wavelength converting material regions 116 may be partially (or completely) disposed in contact with the light emission surface 121 of the light guide 110. Alternatively, or additionally, wavelength converting material may be disposed within and/or under the light guide.

The density of the wavelength converting material per unit area of the emission surface can vary monotonically with distance along the length of the light guide (e.g., related to distance from the light-emitting device). The density of wavelength converting material per unit area of the emission surface can vary at least partially due to a varying density of wavelength converting material, a varying thickness, a varying spatial arrangement and/or size of a plurality of wavelength converting material regions 116, as previously described. In the illustrated assembly of FIGS. 8A-B, the density varies along the length of the light guide due to a varying distance between wavelength converting material regions 116 (e.g., distance between strips that include wavelength converting material).

Illumination assembly 800 may include one or more wavelength filters. The wavelength filters may be reflective filters that can reflect light in some range of wavelengths and transmit light with wavelengths outside the range, and/or the wavelength filter may be absorptive filters that can absorb light in some range of wavelengths and transmit light with wavelengths outside the range. The wavelength filters may include short-pass, long-pass filters, or combinations thereof.

In some embodiments, a wavelength filter may be disposed in the optical path between the solid sate light-emitting device and the wavelength converting material. This filter may prevent any wavelength converted light from entering the light-emitting device or escaping via the exposed region of the light input edge. For example, illumination assembly 800 may include a wavelength filter 129 arranged over the input edge 122 of the light guide 110. Wavelength filter 129 may be configured to allow primary light (e.g., blue and/or UV light) emitted by the light emitted device 150 to be transmitted, and to reflect secondary light (e.g., down-converted light) emitted by the wavelength converting material in regions 116. Thus, wavelength filter 129 may prevent secondary light from escaping the light guide 110 via edge 122.

In some embodiments, a wavelength filter may be disposed in the optical path between the wavelength converting material and the before the output of the illumination assembly. This filter may prevent any primary light from escaping the illumination assembly and may be particularly useful when the primary light is UV light. Illumination assembly 800 may include such a wavelength filter 128 which may be disposed over the emission surface of the light extraction region 114.

In some embodiments, light 102 emitted by the illumination assembly 800 can include a mixture of secondary and primary light. In other embodiments, light 102 emitted by the illumination assembly 800 can include substantially only secondary light. For example, if wavelength filter 128 is absent, light 102 emitted by the illumination assembly may include a combination of primary and secondary light (e.g., white light formed from a combination of various wavelengths, such as blue and yellow light, or blue, green and red light).

Figure 9:
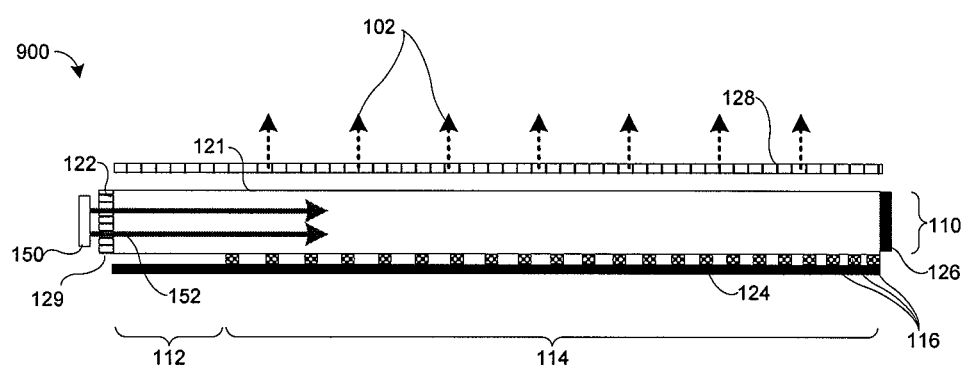
FIG. 9 is a cross-section view of an illumination assembly including wavelength converting material under a backside surface of a light guide, in accordance with one embodiment.

FIG. 9 is a cross-section view of an illumination assembly 900 including wavelength converting material disposed under a backside surface of a light guide 110, in accordance with one embodiment. In the illustrated illumination assembly 900, light extraction features may be absent. The light guide 110 can include a backside surface opposing the light emission surface 121 of the light guide 110, and wavelength converting material regions 116 may be partially (or completely) disposed under the backside surface. The wavelength converting material regions 116 can be partially (or completely) disposed in contact with the backside surface of the light guide 110. Alternatively, or additionally, the wavelength converting material may be disposed within the light guide 110. The wavelength converting material regions 116 may be disposed in contact with backside reflector 124, which can aid in the extraction of any heat generated by the wavelength converting material. Backside reflector 124 may be thermally coupled to a heat sink to provide for heat dissipation.

Figure 10:
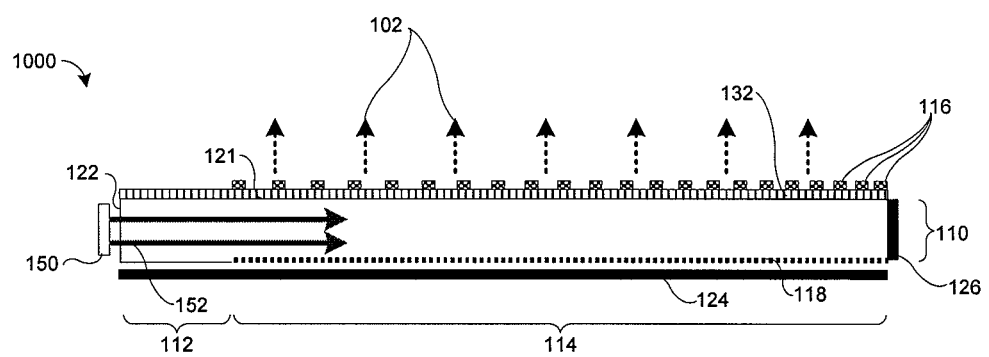
FIG. 10 is a cross-section view of an illumination assembly including wavelength converting material over a light emission surface of a light guide, in accordance with one embodiment.

FIG. 10 is a cross-section view of an illumination assembly 1000 including wavelength converting material disposed over a light emission surface 121 of a light guide 110, in accordance with one embodiment. A wavelength filter 132 may be disposed between the light emission surface 121 of the light guide 110 and wavelength converting material regions 116. Wavelength filter 132 may be configured to transmit primary light and reflect secondary light emitted by the wavelength converting material. Thus, wavelength filter 132 may reflect secondary light that is emitted by the wavelength converting material in regions 116 so as to prevent the secondary light from entering the light guide 110.

Figure 11A:
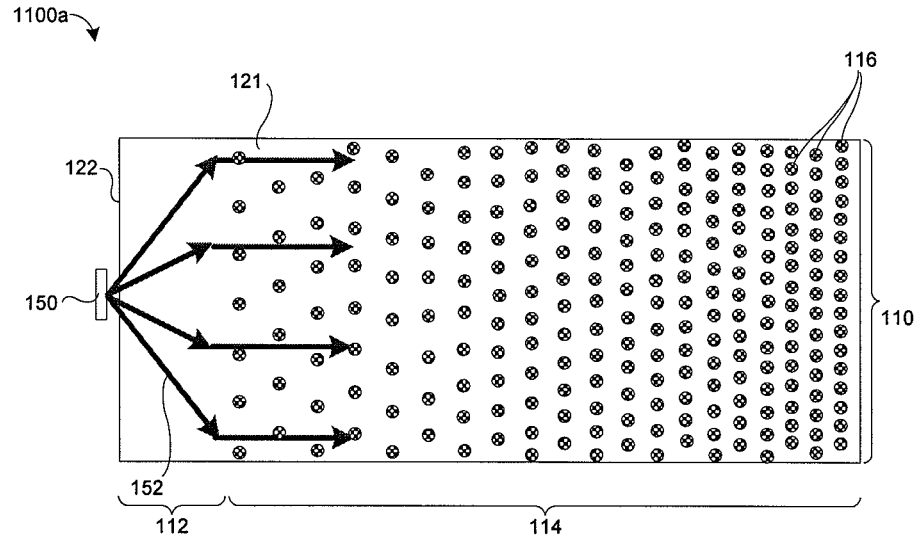
FIG. 11A is a top view of an illumination assembly including a plurality of wavelength converting material regions, in accordance with one embodiment.

FIG. 11A is a top view of an illumination assembly 1100a including a plurality of wavelength converting material regions 116, in accordance with one embodiment. The wavelength converting material regions 116 may be arranged with a varying nearest neighbor distance at different locations along a light guide 110, thereby providing for a varying density of wavelength converting material along the light extraction region 114. The wavelength converting material regions 116 may have any shape, for example, the regions may comprise dots, as illustrated in FIG. 11A. Additionally or alternatively, the thickness and/or size of the wavelength converting material regions 116 may vary in different locations of the light extraction region 114. For example, the regions 116 may be thicker closer to the light-emitting device 150.

Figure 11B:
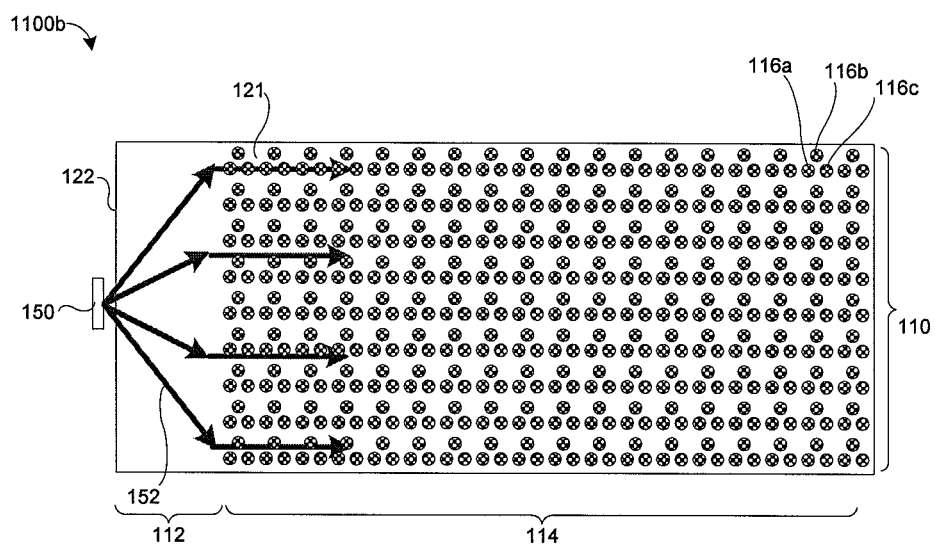
FIG. 11B is a top view of an illumination assembly including a plurality of wavelength converting material regions, in accordance with one embodiment.

FIG. 11B is a top view of an illumination assembly 1100b including a wavelength converting material, in accordance with one embodiment. Illumination assembly 1100b can include a plurality of wavelength converting material regions (e.g., dots 116a-c) that can be arranged so as to aligned with and disposed over a plurality of display pixel light valves (of a liquid crystal layer) so as to individually illuminate the pixel light valves. For example, the display pixel light valves may be part of a liquid crystal layer (not shown for clarity) placed over the emission surface 121 of the illumination assembly 1100b, as previously illustrated and described in FIG. 1C. The size of each wavelength converting material region (e.g., dots 116a-c) can be about the size of the display pixel light-valves.

Different wavelength converting materials (e.g., red-emitting phosphor, green-emitting phosphor, blue-emitting phosphor) can be located in different wavelength converting material regions (e.g., dots 116a-c) such that different pixel light valves can be illuminated with a different color of light. Such assemblies can allow for the elimination of color filters in LCDs and can thus improve the LCD system efficiency. In some such assemblies, the light-emitting devices can emit UV primary light which can be converted by different wavelength converting materials in different regions (e.g., dots). In some such assemblies, the light-emitting devices can emit blue primary light. When blue primary light is used, red-emitting and green-emitting wavelength converting materials can be used to illuminate red and green pixel light valves, respectively, whereas blue pixel light valves can be illuminated by the primary light (e.g., which can be extracted locally using light scattering features of the light guide 110 aligned with the blue pixel light valves).

Figure 12A:
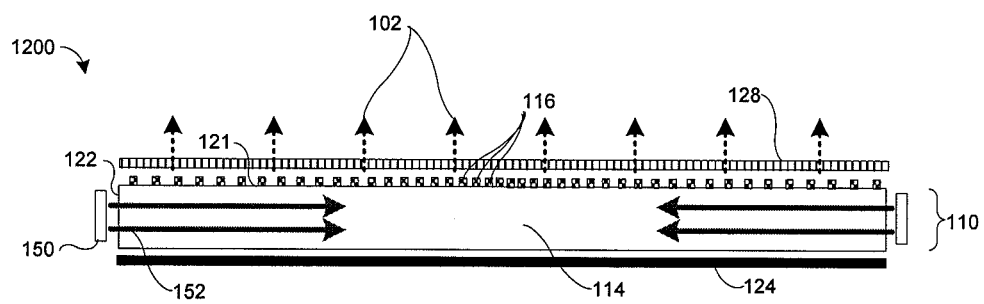
FIGS. 12A-B are cross-section and top views, respectively, of an illumination assembly including a wavelength converting material, in accordance with one embodiment.
Figure 12B:
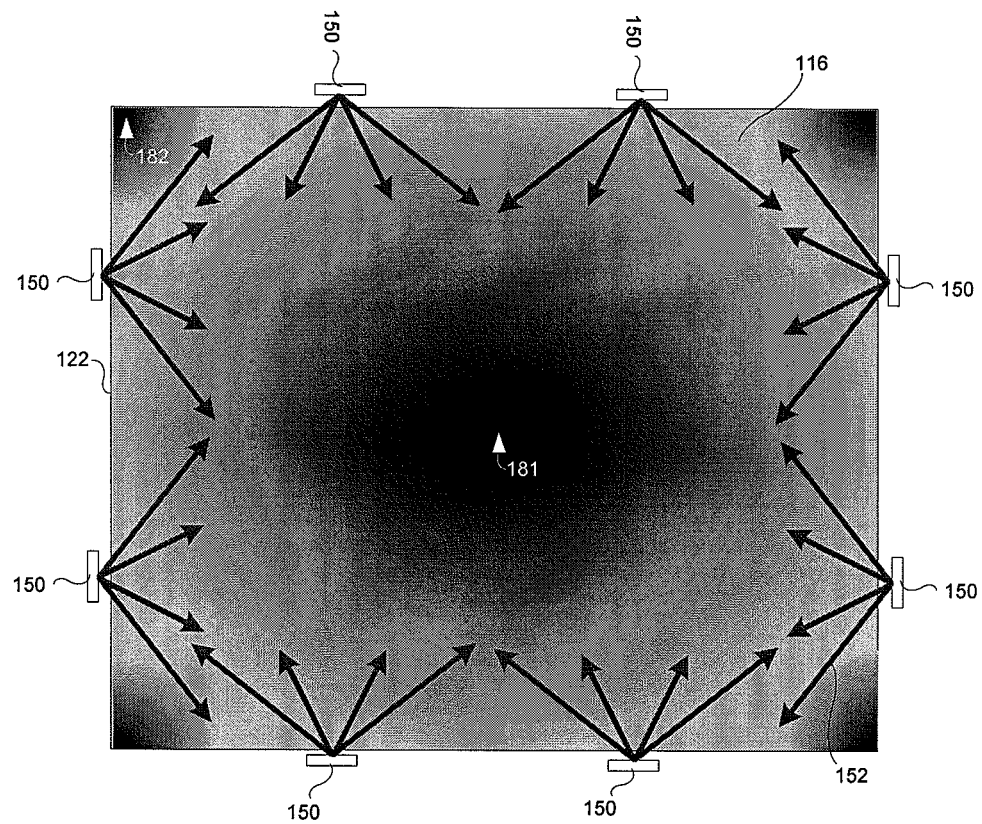

FIGS. 12A-B are cross-section and top views, respectively, of an illumination assembly 1200 including wavelength converting material having a spatially varying density (e.g., per unit area over an averaging area of 1×1 cm$^2$ on the emission surface of the assembly), in accordance with one embodiment. A plurality of light-emitting devices 150 can be arranged to emit light into one or more edges of the light guide 110. The wavelength converting material density (e.g., per unit area over an averaging area of 1×1 cm$^2$ on the emission surface of the assembly) can vary in one or two dimensions. FIG. 12B illustrates an embodiment where the spatial variation of the wavelength converting material density per unit area can vary in two dimensions that define the emission surface 121.

The density of the wavelength converting material per unit area can be configured so as be higher in portions of the light guide 110 where the primary light intensity is lower. For example, when the primary light intensity is lower in the center portion 181 and the corner portions 182 of the light guide 110, the wavelength converting material may have a higher density (as illustrated by the darker shaded portions of the top view in FIG. 12B) in those portions of the light guide 110. Such an inverse relationship can allow for compensation of decreased primary light intensity along the light guide 110 such that light 102 emitted by the illumination assembly can be substantially spatially uniform across the entire emission surface 121.

Figure 13:
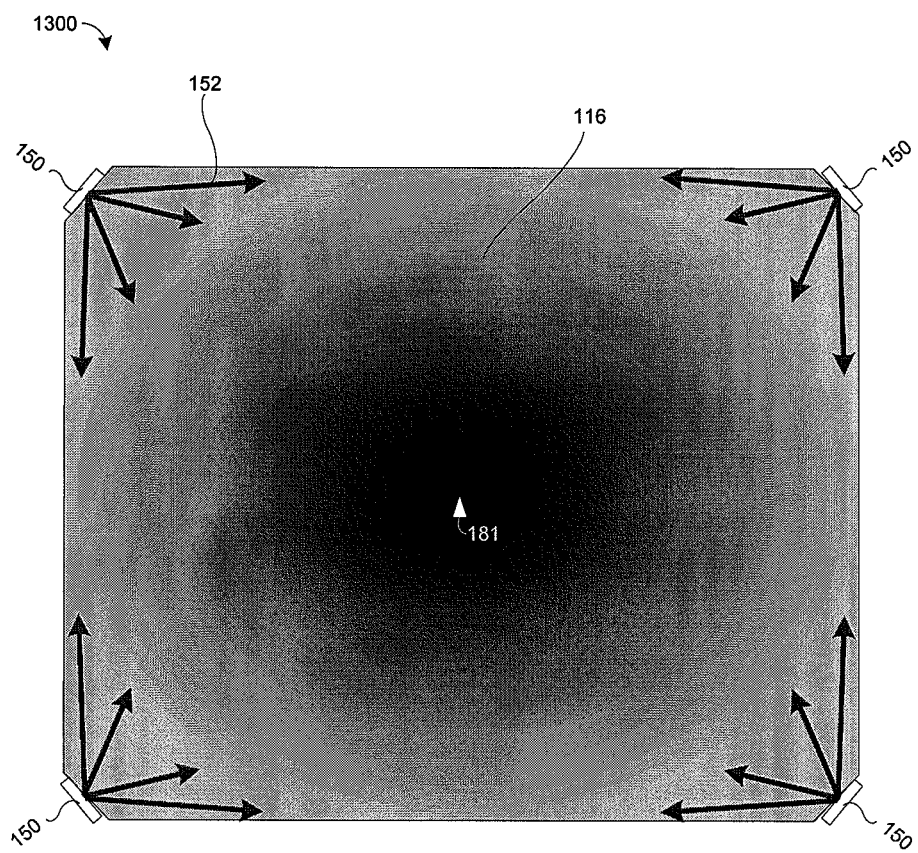
FIG. 13 is a top view of an illumination assembly including a wavelength converting material, in accordance with one embodiment.

FIG. 13 is a top view of an illumination assembly 1300 including a wavelength converting material having a spatially varying density (e.g., per unit area over an averaging area of 1×1 cm$^2$ on the emission surface), in accordance with one embodiment. Illumination assembly 1300 is similar to illumination assembly 1200, except that the plurality of light-emitting devices 150 can emit light into the corner portions of light guide. Such an arrangement can allow for a more spatially uniform primary light intensity within the light guide 110, as compared to the assembly 1200 of FIG. 12. In turn, for circumstances where a spatially uniform light emission is desired from the illumination assembly, the wavelength converting material density per unit area need only have a higher value in the center portion 181 of the light guide. In some embodiments, a portion or all of the edges of the light guide (not coupling light from light-emitting devices 150) may be coated with a reflective material (e.g., a metal such as aluminum and/or silver) so as to prevent any light (e.g., primary and/or secondary light) from escaping the light guide.

Figure 14A:
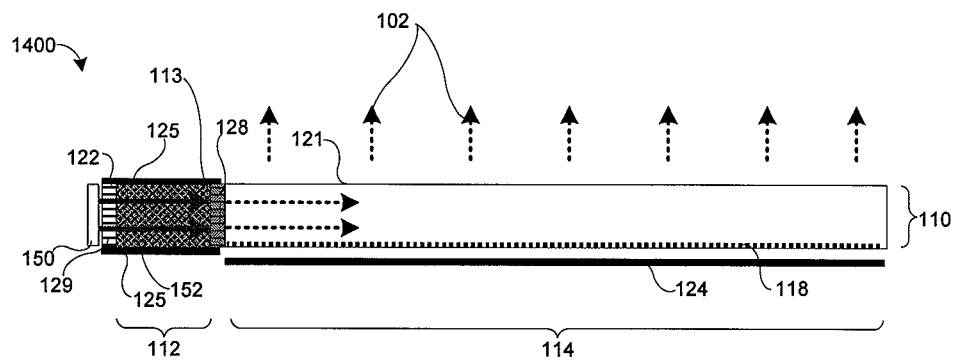
FIGS. 14A-B are cross-section and top views, respectively, of an illumination assembly including a wavelength converting material and one or more wavelength filters, in accordance with one embodiment.
Figure 14B:
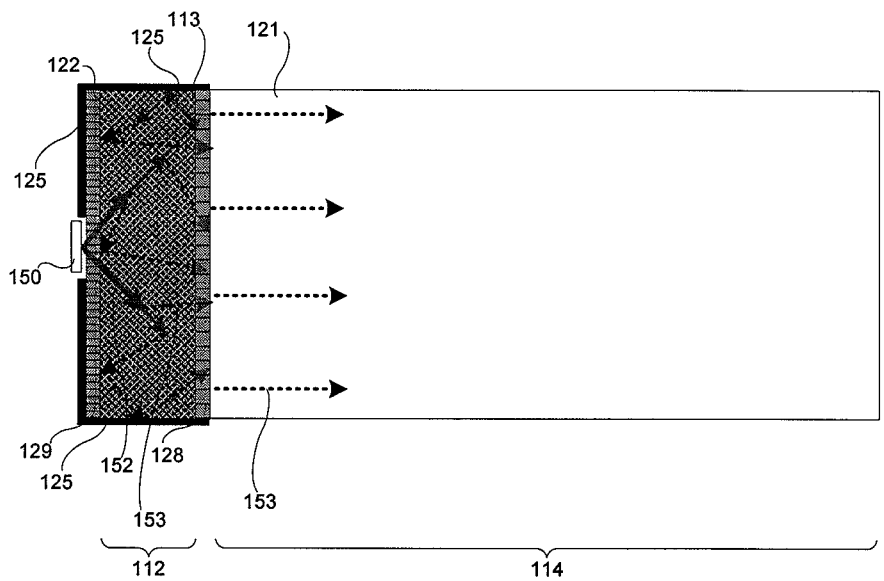

FIGS. 14A-B are cross-section and top views, respectively, of an illumination assembly 1400 including a wavelength converting material and one or more wavelength filters, in accordance with one embodiment.

Illumination assembly 1400 can include one or more solid state light-emitting devices 150. A light guide 110 can be configured to receive primary light 152 emitted by the solid state light-emitting device 150, where the light guide 110 can have a length along which light propagates and an emission surface 121 through which light is emitted. A wavelength converting material that can generate secondary light 153 can be disposed in the optical path between the solid state light-emitting device 150 and the emission surface 121 of the light guide.

One or more wavelength filter(s) (e.g., filter 129) can be disposed in the optical path between the solid sate light-emitting device 150 and the wavelength converting material. The wavelength filter 129 can be configured to transmit primary light emitted by the light-emitting device 150 and reflect secondary light (e.g., wavelength converted light). Thus, wavelength filter 129 can comprise a short pass wavelength filter disposed over (e.g., directly on) the light input side 122 of the light homogenization region, wherein the short pass wavelength filter is configured to transmit light from the solid state light-emitting device 150 and reflect wavelength converted light from the wavelength converting material. Wavelength filter 129 can thus prevent wavelength converted light that is back-emitted or back-scattered from escaping the homogenization region 112.

Illumination assembly 1400 can include light homogenization region 112 disposed in the optical path between the solid state light-emitting device 150 and the emission surface 121 of the light guide 110. The wavelength converting material may be disposed within the light homogenization region 112. As used herein, the term "disposed within" means located inside the homogenization region and not located at the input or output edges of the homogenization region.

The wavelength converting material can be disposed within at least a portion of the homogenization region 112 or throughout the entire homogenization region 112. Alternatively, or additionally, the wavelength converting material can be located at one or more edges of the light homogenization region, for example on the light input edge 122 and/or the light output edge 113 of the homogenization region. In some embodiments, the density of the wavelength converting material can vary at different locations in the homogenization region 112. For example, the density of the wavelength converting material may be higher further away from the light input edge 122.

In some embodiments, illumination assembly 1400 can include wavelength filter 128 (e.g., a long pass wavelength filter) on a light output side of the light homogenization region 112. Wavelength filter 128 can be configured to transmit the wavelength converted light (e.g., secondary light) from the wavelength converting material and reflect primary light emitted by the solid state light-emitting device 150.

Multiple wavelength filters can be arranged in a cascading configuration, where the light output of one wavelength filter can serve as the light input of another wavelength filter. Wavelength converting material can be disposed in the optical path between the light output side of one wavelength filter and the light input side of another wavelength filter. The wavelength converting material can be different (e.g., wavelength convert different wavelength ranges and/or generate different wavelengths of secondary light) in different regions. For example, different wavelength converting materials can be cascaded in the optical path. In some embodiments, lower energy (e.g., longer wavelength) light can be generated by a wavelength converting material closer to the light-emitting device 150 and successfully higher energy light (e.g., shorter wavelength) can be generated by one or more different wavelength converting materials arranged in succession thereafter. In other embodiments, high energy (e.g., shorter wavelength) light can be generated by a wavelength converting material closer to the light-emitting device 150 and successfully lower energy light (e.g., longer wavelength) can be generated by one or more different wavelength converting materials arranged in succession thereafter.

Different wavelength converting materials can be isolated from another by one or more wavelength filters. The wavelength filter(s) can be configured to prevent secondary light from a given wavelength converting material from entering a different wavelength converting material located closer to the light-emitting device 150. For example, the illumination assembly 1400 can comprise a second short pass wavelength filter (in addition to wavelength filter 129) and a second wavelength converting material different from the first wavelength converting material. The second short pass filter can be disposed in the optical path between the wavelength converting material and the second wavelength converting material, and the second short pass wavelength filter can be configured to transmit light from the solid state light-emitting device, transmit wavelength converted light from the wavelength converting material, and reflect wavelength converted light from the second wavelength converting material.

In some embodiments, illumination assembly 1400 can include one or more reflective surfaces 125 on one or more surfaces and/or edges of the light homogenization region 114. The reflective surfaces 125 can prevent light (e.g., primary and/or secondary light) from escaping via edges and/or surfaces of the homogenization region 112. Thus, in such an embodiment, light can essentially be outputted only from the light output edge 113 of the light homogenization region and not via other edges or surfaces of the light homogenization region 112.

Figure 15A:
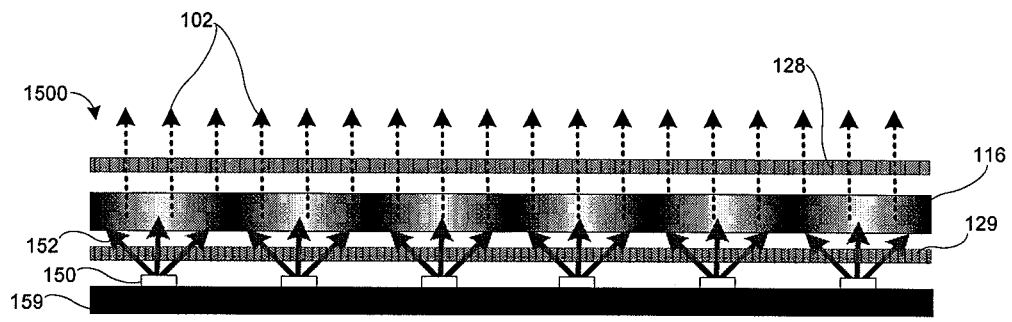
FIGS. 15A-B are cross-section and top views, respectively, of an illumination assembly including a wavelength converting material, in accordance with one embodiment.
Figure 15B:
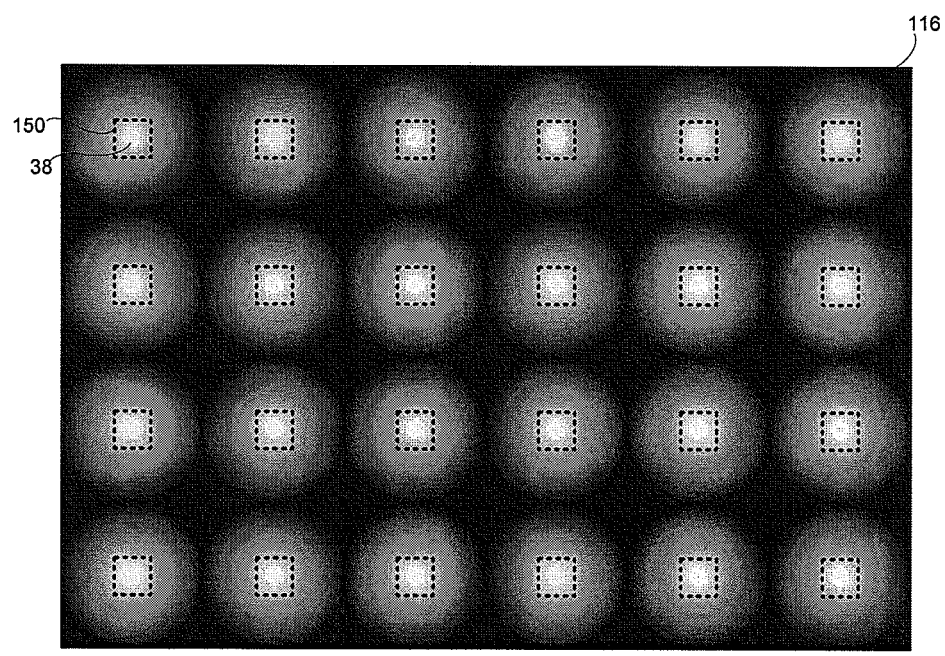

FIGS. 15A-B are cross-section and top views, respectively, of an illumination assembly 1500 including a backlight wavelength converting region 116, in accordance with one embodiment. Illumination assembly 1500 can include one or more light-emitting devices 150 including light emission surfaces 38. The wavelength converting material 116 can be disposed over the light emission surfaces 38 of the solid state light-emitting devices 150. Thus, in such an arrangement, the light-emitting devices 150 can directly backlight the wavelength converting material 116 with primary light 152 emitted by the light-emitting devices 150.

The one or more solid state light-emitting devices 150 can be located on a first plane. In one embodiment, the solid state light-emitting devices 150 are supported by a thermal management system, which can include a heat conductive plane 159 (e.g., a metal planar layer). The wavelength converting material 116 can be disposed over the emission surfaces of the light-emitting devices 150 and, in some instances, may be arranged on a second plane substantially parallel to the first plane on which the light-emitting devices 150 can be arranged.

In one embodiment, the wavelength converting material 116 can have a density per unit area that is different at different locations (e.g., at different locations of the second plane). For example, first and second locations of the wavelength converting material 116 may be located at different locations of the second plane parallel to the first plane one which the light-emitting devices 150 can be located. The first locations may be disposed over the light emission surfaces 38 of the light-emitting devices 150 and second locations may be disposed over regions in-between the light emission surfaces 38 of the light-emitting devices 150. The density of wavelength converting material in the first regions may be lower than the density of wavelength converting material in the second regions. Such an arrangement can compensate for a lower primary light intensity at regions in-between the light-emitting devices 150 (e.g., not directly above a light-emitting device 150 emission area 38) so as to provide for substantially similar secondary light intensity across the entire emission surface of the illumination assembly (e.g., the second plane). Generally, in some embodiments, the wavelength converting material 116 can have a lower density per unit area in locations illuminated with a higher intensity of primary light than in locations illuminated with a lower intensity of primary.

In some embodiments, the illumination assembly 1500 can include one or more wavelength filters. Wavelength filter 129 may be disposed between the light-emitting devices 150 and the wavelength converting material 116. Wavelength filter 129 may include a short pass filter configured to transmit primary light from the light-emitting devices and reflect secondary light generated by the wavelength converting material in region 116. In some embodiments, wavelength filter 128 may be disposed over the emission surface of the wavelength converting material 116. Wavelength filter 128 may include a long pass filter configured to transmit secondary light generated by the wavelength converting material in region 116 and reflect primary light emitted by the light-emitting devices 150. Such an arrangement can be beneficial when the primary light is ultra-violet light and the secondary light is visible light. In these arrangement, it may be desirable to only output secondary visible light (e.g., light 102) and reflect back ultra-violet primary light (e.g., using filter 128) so as not to expose a viewer of the illumination assembly to ultra-violet light. Alternatively, light 102 may include a mixture of primary and secondary light, for example a mixture of blue primary light and secondary light, such as yellow, red, and/or green light. Such arrangements can be used to generate white light.

Various methods can be employed to make the illumination assemblies described herein. With regards to forming the wavelength converting material regions, methods such as printing, molding (e.g., injection molding), coating, spraying, and/or embossing may be employed. For example, a printing process (e.g., a jet printing process) may be used to create wavelength converting material having a spatially varying density (e.g., per unit area of the emission surface of the illumination assembly). The printer cartridge may include a solution comprising the wavelength converting material (e.g., phosphor and/or quantum dots). Varying thickness of a wavelength converting material region can then be created by performing a longer printing step at different locations. Alternatively, or additionally, small features (e.g., dots, stripes) with small sizes (e.g., less than 500 microns, less than 200 microns, less than 100 microns) can be printed with a spatially varying nearest neighbor distance. In other embodiments, wavelength converting material may be included in a molding material (e.g., a polymer such as PMMA or acrylic) so as to have a varying density at different locations of the molded component, such as a molded light guide.

In some embodiments, an illumination assembly may include a thermal management system that can dissipate heat produced by the light-emitting devices. In some embodiments, the thermal management system may be located on the backside of the illumination assembly (e.g., the side opposite the light emission surface). Such a feature may be desirable when the light-emitting devices are high-power light-emitting devices that generate significant amounts of heat, as may be the case when few light-emitting devices are used to illuminate each tile. Examples of thermal management systems for display and illumination systems are provided in U.S. patent application Ser. No. 11/413,968, entitled "LCD Thermal Management Methods and Systems," filed on Apr. 28, 2006, which is herein incorporated by reference in its entirety. Generally, a thermal management system may include a suitable system that can conduct and dissipate heat which may be generated by devices and components of the illumination assembly. In some embodiments, a thermal management system may be characterized by, or may include one or more components that are characterized by, a thermal conductivity greater than 5,000 W/mK, greater than 10,000 W/mK, and/or greater than 20,000 W/mK. In some embodiments, the thermal conductivity lies in a range between 10,000 W/mK and 50,000 W/mK (e.g., between 10,000 W/mK and 20,000 W/mK, between 20,000 W/mK and 30,000 W/mK, between 30,000 W/mK and 40,000 W/mK, between 40,000 W/mK and 50,000 W/mK).

In some embodiments, a thermal management system can include passive and/or active heat exchanging mechanisms. Passive thermal management systems can include structures formed of one or more materials that rapidly conduct heat as a result of temperature differences in the structure. Thermal management systems may also include one or more protrusions which can increase the surface contact area with the surrounding ambient and therefore facilitate heat exchange with the ambient. In some embodiments, a protrusion may include a fin structure that may have a large surface area. In a further embodiment, a thermal management system can include channels in which fluid (e.g., liquid and/or gas) may flow so as to aid in heat extraction and transmission. For example, the thermal management system may comprise one or more heat pipes to facilitate heat removal. Various heat pipes are well known to those in the art, and it should be understood that the embodiments presented herein are not limited to merely to such examples of heat pipes. Heat pipes can be designed to have any suitable shape, and are not necessarily limited to only cylindrical shapes. Other heat pipe shapes may include rectangular shapes which may have any desired dimensions. In some embodiments, one or more heat pipes may be arranged such that a first end of the heat pipes is located in regions of the illumination assembly that are exposed to high temperatures, such as in proximity to one or more light-emitting devices. A second end of the heat pipes (i.e., a cooling end) may be exposed to the ambient. The heat pipes may be in thermal contact with protrusions to aid in heat exchange with the ambient by providing increased surface area. Since heat pipes may have a thermal conductivity that is many times greater (e.g., 5 times greater, 10 times greater) than the thermal conductivity of many metals (e.g., copper), the conduction of heat may be improved via the incorporation of the heat pipes into illumination systems.

Active thermal management systems may include one or more suitable means that can further aid in the extraction and transmission of heat. Such active thermal management systems can include mechanical, electrical, chemical and/or any other suitable means to facilitate the exchange of heat. In one embodiment, an active thermal management system may include a fan used to circulate air and therefore provide cooling. In another embodiment, a pump may be used to circulate a fluid (e.g., liquid, gas) within channels in the thermal management system. In further embodiments, the thermal management system may include a thermal electric cooler that may further facilitate heat extraction.

Figure 16:
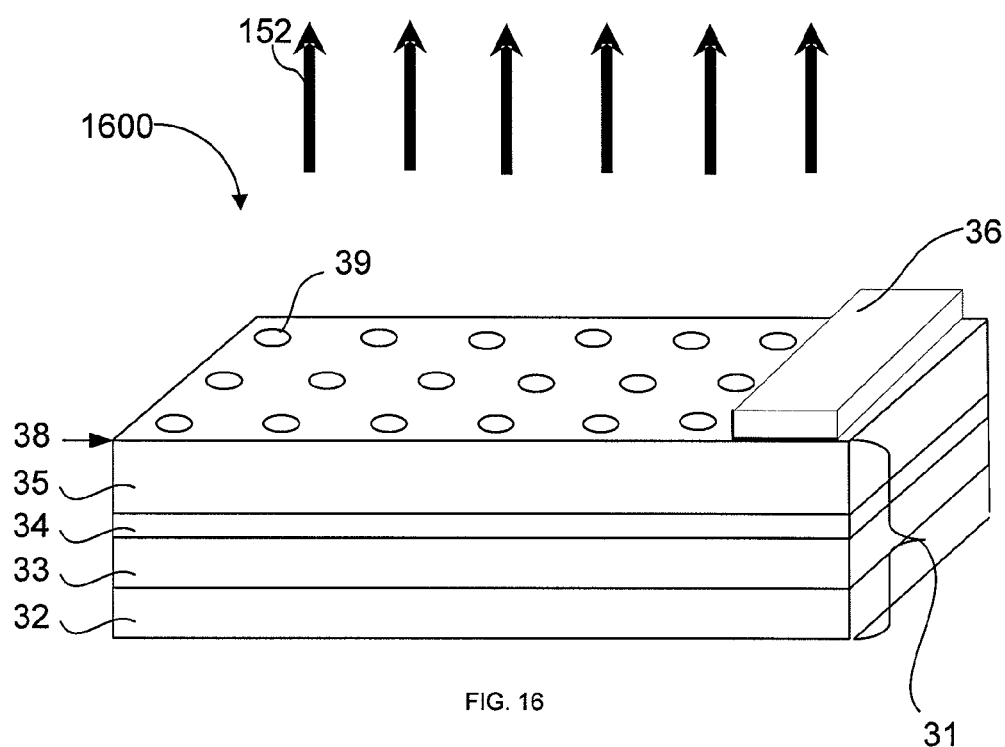
FIG. 16 is a perspective view of a solid state light-emitting device, in accordance with one embodiment.

In some embodiments, the solid state light-emitting devices in the illumination assemblies presented herein can include a light-emitting diode. FIG. 16 illustrates a light-emitting diode (LED) which may be one example of a light-emitting device, in accordance with one embodiment. It should be understood that various embodiments presented herein can also be applied to other light-emitting devices, such as laser diodes, and LEDs having different structures (such as organic LEDs, also referred to as OLEDs). LED 1600 shown in FIG. 16 comprises a multi-layer stack 31 that may be disposed on a support structure (not shown). The multi-layer stack 31 can include an active region 34 which is formed between n-doped layer(s) 35 and p-doped layer(s) 33. The stack can also include an electrically conductive layer 32 which may serve as a p-side contact, which can also serve as an optically reflective layer. An n-side contact pad 36 may be disposed on layer 35. Electrically conductive fingers (not shown) may extend from the contact pad 36 and along the surface 38, thereby allowing for uniform current injection into the LED structure.

It should be appreciated that the LED is not limited to the configuration shown in FIG. 16, for example, the n-doped and p-doped sides may be interchanged so as to form a LED having a p-doped region in contact with the contact pad 36 and an n-doped region in contact with layer 32. As described further below, electrical potential may be applied to the contact pads which can result in light generation within active region 34 and emission (represented by arrows 152) of at least some of the light generated through an emission surface 38. As described further below, holes 39 may be defined in an emission surface to form a pattern that can influence light emission characteristics, such as light extraction and/or light collimation. It should be understood that other modifications can be made to the representative LED structure presented, and that embodiments are not limited in this respect.

The active region of an LED can include one or more quantum wells surrounded by barrier layers. The quantum well structure may be defined by a semiconductor material layer (e.g., in a single quantum well), or more than one semiconductor material layers (e.g., in multiple quantum wells), with a smaller electronic band gap as compared to the barrier layers. Suitable semiconductor material layers for the quantum well structures can include InGaN, AlGaN, GaN and combinations of these layers (e.g., alternating InGaN/GaN layers, where a GaN layer serves as a barrier layer). In general, LEDs can include an active region comprising one or more semiconductors materials, including III-V semiconductors (e.g., GaAs, AlGaAs, AlGaP, GaP, GaAsP, InGaAs, InAs, InP, GaN, InGaN, InGaAlP, AlGaN, as well as combinations and alloys thereof), II-VI semiconductors (e.g., ZnSe, CdSe, ZnCdSe, ZnTe, ZnTeSe, ZnS, ZnSSe, as well as combinations and alloys thereof), and/or other semiconductors. Other light-emitting materials are possible such as quantum dots or organic light-emission layers.

The n-doped layer(s) 35 can include a silicon-doped GaN layer (e.g., having a thickness of about 4000 nm thick) and/or the p-doped layer(s) 33 include a magnesium-doped GaN layer (e.g., having a thickness of about 40 nm thick). The electrically conductive layer 32 may be a silver layer (e.g., having a thickness of about 100 nm), which may also serve as a reflective layer (e.g., that reflects upwards any downward propagating light generated by the active region 34). Furthermore, although not shown, other layers may also be included in the LED; for example, an AlGaN layer may be disposed between the active region 34 and the p-doped layer(s) 33. It should be understood that compositions other than those described herein may also be suitable for the layers of the LED.

As a result of holes 39, the LED can have a dielectric function that varies spatially according to a pattern. Typical hole sizes can be less than about one micron (e.g., less than about 750 nm, less than about 500 nm, less than about 250 nm) and typical nearest neighbor distances between holes can be less than about one micron (e.g., less than about 750 nm, less than about 500 nm, less than about 250 nm). Furthermore, as illustrated in the figure, the holes 39 can be non-concentric.

The dielectric function that varies spatially according to a pattern can influence the extraction efficiency and/or collimation of light emitted by the LED. In some embodiments, a layer of the LED may have a dielectric function that varies spatially according to a pattern. In the illustrative LED 1600, the pattern is formed of holes, but it should be appreciated that the variation of the dielectric function at an interface need not necessarily result from holes. Any suitable way of producing a variation in dielectric function according to a pattern may be used. For example, the pattern may be formed by varying the composition of layer 35 and/or emission surface 38. The pattern may be periodic (e.g., having a simple repeat cell, or having a complex repeat super-cell), or non-periodic. As referred to herein, a complex periodic pattern is a pattern that has more than one feature in each unit cell that repeats in a periodic fashion. Examples of complex periodic patterns include honeycomb patterns, honeycomb base patterns, (2×2) base patterns, ring patterns, and Archimedean patterns. In some embodiments, a complex periodic pattern can have certain holes with one diameter and other holes with a smaller diameter. As referred to herein, a non-periodic pattern is a pattern that has no translational symmetry over a unit cell that has a length that is at least 50 times the peak wavelength of light generated by one or more light-generating portions. As used herein, peak wavelength refers to the wavelength having a maximum light intensity, for example, as measured using a spectroradiometer. Examples of non-periodic patterns include aperiodic patterns, quasi-crystalline patterns (e.g., quasi-crystal patterns having 8-fold symmetry), Robinson patterns, and Amman patterns. A non-periodic pattern can also include a detuned pattern (as described in U.S. Pat. No. 6,831,302 by Erchak, et al., which is incorporated herein by reference in its entirety). In some embodiments, a device may include a roughened surface. The surface roughness may have, for example, a root-mean-square (rms) roughness about equal to an average feature size which may be related to the wavelength of the emitted light.

In certain embodiments, an interface of a light-emitting device is patterned with holes which can form a photonic lattice. Suitable LEDs having a dielectric function that varies spatially (e.g., a photonic lattice) have been described in, for example, U.S. Pat. No. 6,831,302 B2, entitled "Light emitting devices with improved extraction efficiency," filed on Nov. 26, 2003, which is herein incorporated by reference in its entirety. A high extraction efficiency for an LED implies a high power of the emitted light and hence high brightness which may be desirable in various optical systems.

It should also be understood that other patterns are also possible, including a pattern that conforms to a transformation of a precursor pattern according to a mathematical function, including, but not limited to an angular displacement transformation. The pattern may also include a portion of a transformed pattern, including, but not limited to, a pattern that conforms to an angular displacement transformation. The pattern can also include regions having patterns that are related to each other by a rotation. A variety of such patterns are described in U.S. Patent Publication No. 20070085098, entitled "Patterned devices and related methods," filed on Mar. 7, 2006, which is herein incorporated by reference in its entirety.

Light may be generated by the LED as follows. The p-side contact layer can be held at a positive potential relative to the n-side contact pad, which causes electrical current to be injected into the LED. As the electrical current passes through the active region, electrons from n-doped layer(s) can combine in the active region with holes from p-doped layer(s), which can cause the active region to generate light. The active region can contain a multitude of point dipole radiation sources that generate light with a spectrum of wavelengths characteristic of the material from which the active region is formed. For InGaN/GaN quantum wells, the spectrum of wavelengths of light generated by the light-generating region can have a peak wavelength of about 445 nanometers (nm) and a full width at half maximum (FWHM) of about 30 nm, which is perceived by human eyes as blue light. The light emitted by the LED may be influenced by any patterned surface through which light passes, whereby the pattern can be arranged so as to influence light extraction and/or collimation.

In other embodiments, the active region can generate light having a peak wavelength corresponding to ultraviolet light (e.g., having a peak wavelength of about 370-390 nm), violet light (e.g., having a peak wavelength of about 390-430 nm), blue light (e.g., having a peak wavelength of about 430-480 nm), cyan light (e.g., having a peak wavelength of about 480-500 nm), green light (e.g., having a peak wavelength of about 500 to 550 nm), yellow-green (e.g., having a peak wavelength of about 550-575 nm), yellow light (e.g., having a peak wavelength of about 575-595 nm), amber light (e.g., having a peak wavelength of about 595-605 nm), orange light (e.g., having a peak wavelength of about 605-620 nm), red light (e.g., having a peak wavelength of about 620-700 nm), and/or infrared light (e.g., having a peak wavelength of about 700-1200 nm).

In certain embodiments, the LED may emit light having a high light output power. As previously described, the high power of emitted light may be a result of a pattern that influences the light extraction efficiency of the LED. For example, the light emitted by the LED may have a total power greater than 0.5 Watts (e.g., greater than 1 Watt, greater than 5 Watts, or greater than 10 Watts). In some embodiments, the light generated has a total power of less than 100 Watts, though this should not be construed as a limitation of all embodiments. The total power of the light emitted from an LED can be measured by using an integrating sphere equipped with spectrometer, for example a SLM12 from Sphere Optics Lab Systems. The desired power depends, in part, on the optical system that the LED is being utilized within. For example, a display system (e.g., a LCD system) may benefit from the incorporation of high brightness LEDs which can reduce the total number of LEDs that are used to illuminate the display system.

The light generated by the LED may also have a high total power flux. As used herein, the term "total power flux" refers to the total optical power divided by the emission area. In some embodiments, the total power flux is greater than 0.03 Watts/mm$^2$, greater than 0.05 Watts/mm$^2$, greater than 0.1 Watts/mm$^2$, or greater than 0.2 Watts/mm$^2$. However, it should be understood that the LEDs used in systems and methods presented herein are not limited to the above-described power and power flux values.

In some embodiments, the LED may be associated with one or more wavelength converting regions. The wavelength converting region(s) may include one or more phosphors and/or quantum dots. The wavelength converting region(s) can absorb light emitted by the light-generating region of the LED and emit light having a different wavelength than that absorbed. In this manner, LEDs can emit light of wavelength(s) (and, thus, color) that may not be readily obtainable from LEDs that do not include wavelength converting regions. In some embodiments, one or more wavelength converting regions may be disposed over (e.g., directly on) the emission surface (e.g., surface 38) of the light-emitting device.

As used herein, an LED may be an LED die, a partially packaged LED die, or a fully packaged LED die. It should be understood that an LED may include two or more LED dies associated with one another, for example a red light-emitting LED die, a green light-emitting LED die, a blue light-emitting LED die, a cyan light-emitting LED die, or a yellow light-emitting LED die. For example, the two or more associated LED dies may be mounted on a common package. The two or more LED dies may be associated such that their respective light emissions may be combined to produce a desired spectral emission. The two or more LED dies may also be electrically associated with one another (e.g., connected to a common ground).

As used herein, when a structure (e.g., layer, region) is referred to as being "on", "over" "overlying" or "supported by" another structure, it can be directly on the structure, or an intervening structure (e.g., layer, region) also may be present. A structure that is "directly on" or "in contact with" another structure means that no intervening structure is present.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A display assembly, comprising:
pixel light valves arranged in a layer;
a solid-state light-emitting device that outputs a primary light having a primary spectrum;
a light guide configured to receive the primary light emitted by the solid-state light-emitting device, the primary light propagating within the light guide and the light guide comprising a light emission surface juxtaposed with the layer of pixel light valves; and
first wavelength converting material regions and second wavelength converting material regions at the emission surface, the first wavelength converting material regions configured to convert the primary light incident thereon to a first converted light having a first converted wavelength spectrum and the second wavelength converting material regions configured to convert the primary light incident thereon to a second converted light having a second converted wavelength spectrum different from the first converted wavelength spectrum, each wavelength converting material region aligned with a respective pixel light valve and having a size approximately equal to a size of the respective pixel light valve so that the first converted light from the first wavelength converting material regions and the second converted light from the second wavelength converting material regions individually illuminate the respective pixel light valves.

2. The display assembly of claim 1, wherein the first converted light has a lower energy than the second converted light, and the second converted light has a lower energy than the primary light.

3. The display assembly of claim 2, wherein:
the first wavelength converting material regions comprise a first wavelength converting material that converts the primary light to red light;
the second wavelength converting material regions comprise a second wavelength converting material that converts the primary light to green light;
each first wavelength converting material region is aligned with a respective red pixel light valve of the pixel light valves; and
each second wavelength converting material region is aligned with a respective green pixel light valve of the pixel light valves.

4. The display assembly of claim 3, wherein the primary light is blue light, and the illumination assembly further includes light scattering features at the emission surface, the light scattering features aligned with and illuminating blue pixel light valves.

5. The display assembly of claim 1, wherein the primary light is ultraviolet light or blue light.

6. The display assembly of claim 1, additionally comprising third wavelength converting material regions at the emission surface, the third wavelength converting material regions configured to convert the primary light incident thereon to a third converted light having a third converted wavelength spectrum different from the first converted wavelength spectrum and different from the second converted wavelength spectrum, each third wavelength converting material region aligned with a respective pixel light valve and having a size approximately equal to a size of the respective pixel light valve so that the third converted light from the third wavelength converting material regions individually illuminate the respective pixel light valves.

7. The display assembly of claim 6, wherein the first converted light has a lower energy than the second converted light, the second converted light has a lower energy than the third converted light, and the third converted light has a lower energy than the primary light.

8. The display assembly of claim 7, wherein:
the first wavelength converting material regions comprise a first wavelength converting material that converts the primary light to red light;
the second wavelength converting material regions comprise a second wavelength converting material that converts the primary light to green light;
the third wavelength converting material regions comprise a third wavelength converting material that converts the primary light to blue light;
each first wavelength converting material region is aligned with a respective red pixel light valve of the pixel light valves;
each second wavelength converting material region is aligned with a respective green pixel light valve of the pixel light valves; and
each third wavelength converting material region is aligned with a respective blue pixel light valve of the pixel light valves.

9. The display assembly of claim 8, wherein the primary light is ultraviolet light.

10. The display assembly of claim 1, wherein the pixel light valves are liquid crystal light valves.

11. The display assembly of claim 10, wherein the display assembly does not include color filters.

12. The display assembly of claim 1, wherein at least one of the first wavelength converting material regions or the second wavelength converting material regions comprise quantum dots.

13. The display assembly of claim 1, wherein at least one of the first wavelength converting material regions or and the second wavelength converting material regions comprise a phosphor.

14. The display assembly of claim 1, wherein the solid-state light-emitting device comprises a light-emitting diode.

15. The display assembly of claim 1, wherein the solid-state light-emitting device comprises a laser diode.

16. The display assembly of claim 1, wherein at least some of the wavelength converting material regions are embodied as dots.

17. The display assembly of claim 1, wherein the light guide is generally rectangular in a plane parallel to the light emission surface and the light guide comprises a light input edge at a corner portion of the light guide through which the primary light emitted by the solid-state light-emitting device is received.

18. The display assembly of claim 17, wherein the light guide further comprises a light input edge at each corner and the illumination assembly further comprises a solid-state light-emitting device at each corner to input primary light into the light guide through each light input edge.

* * * * *